(12) United States Patent
Chan et al.

(10) Patent No.: US 7,076,553 B2
(45) Date of Patent: Jul. 11, 2006

(54) METHOD AND APPARATUS FOR REAL-TIME PARALLEL DELIVERY OF SEGMENTS OF A LARGE PAYLOAD FILE

(75) Inventors: Desmond Cho-Hung Chan, Mountain View, CA (US); Siew Yong Sim, Cupertino, CA (US); Rajeev Thakur, Santa Clara, CA (US); Trygve Isaacson, San Lorenzo, CA (US); William D. Gropp, Naperville, IL (US)

(73) Assignee: Intel Corporation, Santa Clara, CA (US)

( * ) Notice: Subject to any disclaimer, the term of this patent is extended or adjusted under 35 U.S.C. 154(b) by 976 days.

(21) Appl. No.: 09/984,019

(22) Filed: Oct. 26, 2001

(65) Prior Publication Data

US 2002/0131423 A1 Sep. 19, 2002

Related U.S. Application Data

(63) Continuation-in-part of application No. 09/681,644, filed on May 15, 2001, now Pat. No. 6,970,939.

(60) Provisional application No. 60/278,289, filed on Mar. 23, 2001, provisional application No. 60/278,410, filed on Mar. 23, 2001, provisional application No. 60/278,408, filed on Mar. 23, 2001, provisional application No. 60/266,286, filed on Oct. 26, 2000.

(51) Int. Cl.
*G06F 13/00* (2006.01)

(52) U.S. Cl. ...................... 709/226; 709/219; 709/232; 709/236

(58) Field of Classification Search ................ 709/202, 709/203, 217, 219, 223, 226, 232, 236

See application file for complete search history.

(56) References Cited

U.S. PATENT DOCUMENTS 4,466,060 A 8/1984 Riddle (Continued)

FOREIGN PATENT DOCUMENTS

EP 0 967 559 A1 12/1999

OTHER PUBLICATIONS

Dilly et al. "Enhancement and Validation of Squid's Cache Replacement Policy", HP Labs Technical Reports, HPL-1999-69, pp. 1-18, May 1999. http://www.hpl.hp.com/techreports/1999/HPL-1999-69.pdf.

(Continued)

*Primary Examiner*—Viet D. Vu
(74) *Attorney, Agent, or Firm*—Blakely, Sokoloff, Taylor & Zafman LLP

(57) ABSTRACT

A scalable content delivery network (SCDN) employs a parallel download mechanism to ensure that a demanded file is present at a station in time for user consumption. This mechanism is used in solving the content caching and storage problem for applications such as video-on-demand, which is commonly perceived as a tough problem in the industry. In the network, files are divided into smaller units called tracks according to the nature of data contained in each of them. Tracks are further divided into smaller equally sized units called block files. This division builds the foundation for parallel download. A sequence server provides a lock-free mechanism for multiple threads or processes to access data atomically. The sequence server allows clients to gain sequential access to data, or to find out whether the sequence has been violated so that they can retry their operation or take corrective action. Advantages of the invention include the ability to handle distribution of large files and process sequencing.

21 Claims, 14 Drawing Sheets

U.S. PATENT DOCUMENTS

| | | | | |
|---|---|---|---|---|
| 4,914,571 A | * | 4/1990 | Baratz et al. | 707/10 |
| 5,079,767 A | | 1/1992 | Perlman | |
| 5,367,698 A | | 11/1994 | Webber et al. | |
| 5,630,184 A | | 5/1997 | Roper et al. | |
| 5,751,968 A | | 5/1998 | Cohen | |
| 5,812,773 A | | 9/1998 | Norin | |
| 5,872,773 A | | 2/1999 | Katzela et al. | |
| 5,903,566 A | | 5/1999 | Flammer, III | |
| 5,905,847 A | | 5/1999 | Kobayashi et al. | |
| 5,924,094 A | | 7/1999 | Sutter | |
| 5,924,116 A | | 7/1999 | Aggarwal | |
| 5,926,101 A | | 7/1999 | Dasgupta | |
| 5,991,804 A | | 11/1999 | Bolosky et al. | |
| 6,014,701 A | | 1/2000 | Chaddha | |
| 6,038,061 A | | 3/2000 | Sugaya | |
| 6,038,601 A | | 3/2000 | Lambert et al. | |
| 6,081,840 A | | 6/2000 | Zhao | |
| 6,105,029 A | | 8/2000 | Maddalozzo, Jr. et al. | |
| 6,108,703 A | | 8/2000 | Leighton et al. | |
| 6,145,089 A | | 11/2000 | Le et al. | |
| 6,212,240 B1 | | 4/2001 | Scheibel, Jr. et al. | |
| 6,269,080 B1 | | 7/2001 | Kumar | |
| 6,356,903 B1 | * | 3/2002 | Baxter et al. | 707/10 |
| 6,363,416 B1 | | 3/2002 | Naeimi et al. | |
| 6,370,146 B1 | | 4/2002 | Higgins et al. | |
| 6,374,336 B1 | | 4/2002 | Peters et al. | |
| 6,415,373 B1 | | 7/2002 | Peters et al. | |
| 6,427,212 B1 | | 7/2002 | Frey, Jr. | |
| 6,456,599 B1 | | 9/2002 | Elliott | |
| 6,460,087 B1 | | 10/2002 | Saito et al. | |
| 6,498,795 B1 | | 12/2002 | Zhang et al. | |
| 6,502,125 B1 | | 12/2002 | Kenner et al. | |
| 6,515,967 B1 | | 2/2003 | Wei et al. | |
| 6,523,069 B1 | | 2/2003 | Luczycki et al. | |
| 6,535,869 B1 | | 3/2003 | Housel, III | |
| 6,587,866 B1 | | 7/2003 | Modi et al. | |
| 6,647,408 B1 | | 11/2003 | Ricart et al. | |
| 6,691,165 B1 | | 2/2004 | Bruck et al. | |
| 6,691,312 B1 | | 2/2004 | Sen et al. | |
| 6,708,217 B1 | * | 3/2004 | Colson et al. | 709/231 |
| 6,711,607 B1 | | 3/2004 | Goyal | |
| 6,718,361 B1 | | 4/2004 | Basani et al. | |
| 6,748,447 B1 | | 6/2004 | Basani et al. | |
| 6,760,765 B1 | | 7/2004 | Asai et al. | |
| 6,765,868 B1 | | 7/2004 | Dunn et al. | |
| 6,772,209 B1 | | 8/2004 | Chernock et al. | |
| 6,772,217 B1 | | 8/2004 | Baumann et al. | |
| 6,772,337 B1 | * | 8/2004 | Yener | 713/165 |
| 6,785,704 B1 | | 8/2004 | McCanne | |
| 6,842,896 B1 | | 1/2005 | Redding et al. | |
| 6,845,396 B1 | | 1/2005 | Kanojia et al. | |
| 6,922,724 B1 | | 7/2005 | Freeman et al. | |
| 6,931,397 B1 | * | 8/2005 | Sundaresan | 707/5 |
| 2002/0040479 A1 | | 4/2002 | Ehrman et al. | |
| 2002/0073086 A1 | | 6/2002 | Thompson et al. | |
| 2002/0112069 A1 | | 8/2002 | Sim | |
| 2002/0138640 A1 | | 9/2002 | Raz et al. | |
| 2003/0099202 A1 | | 5/2003 | Lear et al. | |

OTHER PUBLICATIONS

Gruber, S. et al., "Design Considerations for an RTSP-Based Prefix-Caching Proxy for Multimedia Streams", AT&T Labs Research, Sep. 7, 1999, 21 pgs.

Mui, Allen et al., "Performance Analysis of a Dynamic Parallel Downloading Scheme from Mirror Sites Throughout the Internet", 6892 Term Paper, Dec. 1999, pp. 1-13.

Noghami, B. et al., "A Novel Approach to Reduce Latency on the Internet: Component-Based Download", Dept. of Electrical and Computer Engineering, University of Manitoba, Jun. 2000, 6 pgs.

Rodriguez, P. et al., "Parallel-Access for Mirror Sites in the Internet", Infocom 2000, 19th Annual Joint Conference of the IEEE Computer and Communications Societies, IEEE Tel Aviv, Israel, Mar. 26-30, 2000, pp. 864-873.

Search Report for PCT/US01/42816; mailed Dec. 8, 2002; 2 pages.

Search Report for PCT/US01/32638; mailed Jan. 30, 2003; 3 pages.

* cited by examiner

| Bit Number | 1 | 2 | 3 | 4 | 5 | 6 | 7 | 8 | 9 | 10 | 11 | 12 | 13 | 14 | 15 | 16 | |
|---|---|---|---|---|---|---|---|---|---|---|---|---|---|---|---|---|---|
| Attribute Set B | 1 | 0 | 0 | 1 | 0 | 0 | 0 | 0 | 0 | 0 | 0 | 0 | 1 | 0 | 0 | 0 | 300 |
| Attribute Set D | 1 | 0 | 0 | 1 | 0 | 0 | 0 | 0 | 0 | 0 | 0 | 0 | 0 | 1 | 0 | 0 | 310 |
| Attribute Set E | 1 | 0 | 0 | 1 | 0 | 0 | 0 | 0 | 0 | 0 | 0 | 0 | 0 | 0 | 1 | 0 | 320 |
| Attribute Set H | 1 | 0 | 0 | 1 | 0 | 0 | 0 | 0 | 0 | 0 | 0 | 0 | 0 | 0 | 0 | 1 | 330 |
| Rolled up Attribute Set D | 1 | 0 | 0 | 1 | 0 | 0 | 0 | 0 | 0 | 0 | 0 | 0 | 0 | 0 | 0 | 1 | 340 |
| Rolled up Attribute Set B | 1 | 0 | 0 | 1 | 0 | 0 | 0 | 0 | 0 | 0 | 0 | 0 | 0 | 1 | 1 | 1 | 350 |

Figure 3

Distribution of Media Filed in Terms of Block Files in LPCDN

Local Station Receiving Search Replies

METHOD AND APPARATUS FOR REAL-TIME PARALLEL DELIVERY OF SEGMENTS OF A LARGE PAYLOAD FILE

CROSS-REFERENCE TO RELATED APPLICATIONS

This application is a continuation-in-part of U.S. Application Ser. No. 09/681,644, filed May 15, 2001, now U.S. Pat. No. 6,970,939 and claims priority to U.S. Prov. Appl. Nos. 60/278,408, 60/278,410 and 60/278,289, filed Mar. 23, 2001, and to U.S. Prov. Appl. No. 60/266,286, filed Oct. 26, 2000, all of which are incorporated herein by reference. This application also contains related subject matter to that disclosed in commonly owned U.S. application. Ser. No. 09/984,024, filed on even date herewith, and titled "Method and System for Managing Distributed Content and Related Metadata," the full text of which is incorporated herein by reference.

BACKGROUND OF THE INVENTION

1. Field of the Invention

The present invention is related to a system and method for real-time parallel delivery of segments of large payload files. In particular, the invention provides an efficient architecture and technique for storing and transmitting files containing, for example, media content such as audio, video and/or other data to a remote user.

2. Background Art

Advances in telecommunications network communication and switching are moving ahead with great speed. However, transferring large files (e.g., media content such as audio and/or video files) between locations remains a task that can take significant amounts of time. For example, when delivering a large media file, such as a movie, to a user, the transfer time can be on the order of many minutes to hours before use of the file (e.g., viewing of the movie) can begin.

One conventional technique for avoiding such delays in presenting media content to a user is to replicate copies of the content at various locations in the network "near" the user. While this may solve the delay problem, it is an expensive solution since it requires an inordinate amount of storage space to store multiple copies of the media file. It also requires a media management application for operators to manage the replicated copies of content. Storage administrators must carefully manage the storage resources to assure that no site become full. If a site runs out of storage, an attempt to replicate new content to the site will fail.

Other known techniques include application level proxy caching such as web caching and streaming caching. Such solutions do not require the deployment of unmanageable amounts of storage. However, the solution only works if the desired content is cached at a location near the requesting user. If a user requests content that is not cached, the content has to be retrieved from another location, often with an unacceptable delay.

Another problem with conventional content delivery systems is that each system processor or node must handle a number of simultaneous processes or threads. These multiple threads and processes often need atomic access to shared data stored in files. If the threads or processes are running on a single machine, one can use locking mechanisms, such as mutexes or semaphores, provided by the operating system to achieve atomicity. However, such locking mechanisms are more difficult to implement across a cluster of machines. Furthermore, file locking is not reliable when using the Network File System (NFS) to share files among a cluster of machines. One solution to the problem is to develop a lock manager to grant locks to other processes or threads. However, designing a lock manager that can handle failover is difficult. Since the lock manager must keep track of its clients, reconstructing the state before failure can be a challenge.

What is needed is a system and method for distribution of large files that overcomes the limitations of known systems.

BRIEF SUMMARY OF THE INVENTION

The invention is a system, method and computer program product handles distribution of large files over a network such as the global Internet. The scalable content delivery network (SCDN) of the invention places a plurality of distribution centers or stations on the network. A parallel download mechanism ensures that a requested file is present at a station in time for user consumption. This mechanism is used in solving the content caching and storage problem for read-writeable integrated network file system which can be used for delivering large files such as those encountered in video-on-demand, which is commonly perceived as a tough problem in the industry.

The parallel download mechanism of the invention divides files into smaller units called tracks according to the nature of data contained in them. Tracks are further divided into smaller equally sized units called block files. This division builds the foundation for parallel download. In parallel download, a station in the network downloads block files from a number of other stations in parallel and in a non-contiguous manner, thus, achieving high performance. In addition, the station downloads more block files from stations that have higher network bandwidth and fewer (or no) block files from stations with low network bandwidth. The determination of which stations have high or low network bandwidth is done dynamically at run time.

The parallelism in parallel download is implemented in two levels: a process level and a thread level. In each distribution center, a plurality of distribution servers are responsible for fetching the data on-demand in each of the stations. A cluster of distribution servers exist at any station and share the workload of downloading a file, performing process-level parallelism. Moreover, an individual distribution server spawns off a number of threads to fetch block files, performing thread-level parallelism.

The various threads and processes involved in the parallel download need to atomically access metadata stored in shared files. A sequence server provides a lock-free mechanism for multiple threads or processes to access data atomically. It allows clients to gain sequential access to data, or to find out whether the sequence has been violated so that they can retry their operation or take corrective action. The sequence server achieves this by associating a random "sequence number" with each shared data item. The shared data item is a cell or block storage index or flag that indicates whether the requested block file is downloaded, not downloaded or presently being downloaded. When a client asks the sequence server for the value of the shared data item and indicates its intention to modify the value, the sequence server increments the sequence number associated with the data and returns to the client the data as well as the (incremented) sequence number. The client modifies the data value (i.e., the flag) and returns it back to the sequence server together with the sequence number. The sequence server compares the returned sequence number with the sequence number it currently has for that data item. If the number is different, it means that some other client had, in the meanwhile, requested the value of the data time with intention to modify it. In other words, the first client's sequence had been violated: it did not have exclusive access to the data during the time it tried to perform a read-modify-write operation. The sequence server therefore rejects the update request from the first client and informs the client of the sequence violation. The first client then has to take corrective action as necessary. Depending on the context and the convention among clients, it either retries the operation by again requesting a new read and a new sequence number, or it lets the other client perform the operation.

The system of the invention includes a plurality of distribution centers or stations on the network. Each distribution center includes a distribution server cluster having a plurality of distribution servers, a load balancer and a sequence server. The distribution center further includes a control unit, a virtual file control system cluster to interface to one or more application servers, a storage system, a storage switch and an intra-station control related switch.

The invention stores only portions of files at distribution centers. Then, when a file is requested, delivery can begin immediately using the locally stored portion of the file. While the locally stored portions of the file are being delivered, the distribution center can fetch the remainder of the file from one or more other distribution centers. The file can then be assembled only in response to user request. This reduces the amount of local file storage that is required since files are not mirrored at each distribution site.

The method, according to the invention, of assembling a file includes the following steps: determining, based on a request, which content components (i.e., block files) are necessary to assemble the file; if all content components are not present at the first node, sending a search request to determine which other nodes have content components; receiving, from the other nodes, replies to the search request, each reply from a responding node indicating which content components are available from the responding node; determining a desired set of at least one node from which to download the content components; downloading the content components from the desired set; and assembling the file from the downloaded content components. The number of content components or block files to download is determined based at least in part on metadata associated with the file.

When a distribution center is requesting block files from other distribution centers, a hierarchical tree structure is used to efficiently transfer data between the distribution centers while limiting the number of nodes to which a request must be sent. For example, the attributes of a distribution center are known to its neighboring distribution centers. Similarly, any file request includes distribution criteria of the requested file. This permits each distribution center to compare attributes and only forward file requests through the tree structure to appropriate distribution centers. For example, a file having a distribution criteria that includes "U.S. Only" need not be sent to a distribution center located in Europe and having the attribute "Europe."

The invention also includes a computer program product comprising a computer usable medium having computer readable program code means embodied in the medium for causing an application program to execute on a computer to assemble a file in response to a request from a user sent to a first node in a network having a plurality of connected nodes. The computer readable program code means comprises first computer readable program code means for causing the computer to determine, based on the request, which content components are necessary to assemble the file;

second computer readable program code means for causing the computer, if all content components are not present at the first node, to send a search request to determine which other nodes have content components;

third computer readable program code means for causing the computer to receive, from the other nodes, replies to the search request, each reply from a responding node indicating which content components are available from the responding node;

fourth computer readable program code means for causing the computer to determine a desired set of at least one node from which to download the content components;

fifth computer readable program code means for causing the computer to download the content components from the desired set; and sixth computer readable program code means for causing the computer to assemble the file from the downloaded content components.

Advantages of the invention include the ability for multiple threads or processes to download a file with high performance by downloading portions of the file in parallel, and the ability for multiple threads and processes running on different machines to synchronize the parallel download among themselves. These and other features and advantages of the invention will be described in detail below with reference to the accompanying drawings.

BRIEF DESCRIPTION OF THE DRAWINGS/FIGURES

In the drawings, like reference numbers indicate the same or substantially the same elements. Furthermore, the left-most digit(s) of the reference numbers indicate the number of the drawing in which the reference number is first used. The drawings illustrate the present invention and, together with the description, further serve to explain the principles of the invention and to enable a person skilled in the pertinent art to make and use the invention. In the accompanying drawings:

FIG. 3 is a sample attribute bitmap according to an embodiment of the invention;

DETAILED DESCRIPTION OF THE INVENTION

Figure 1:
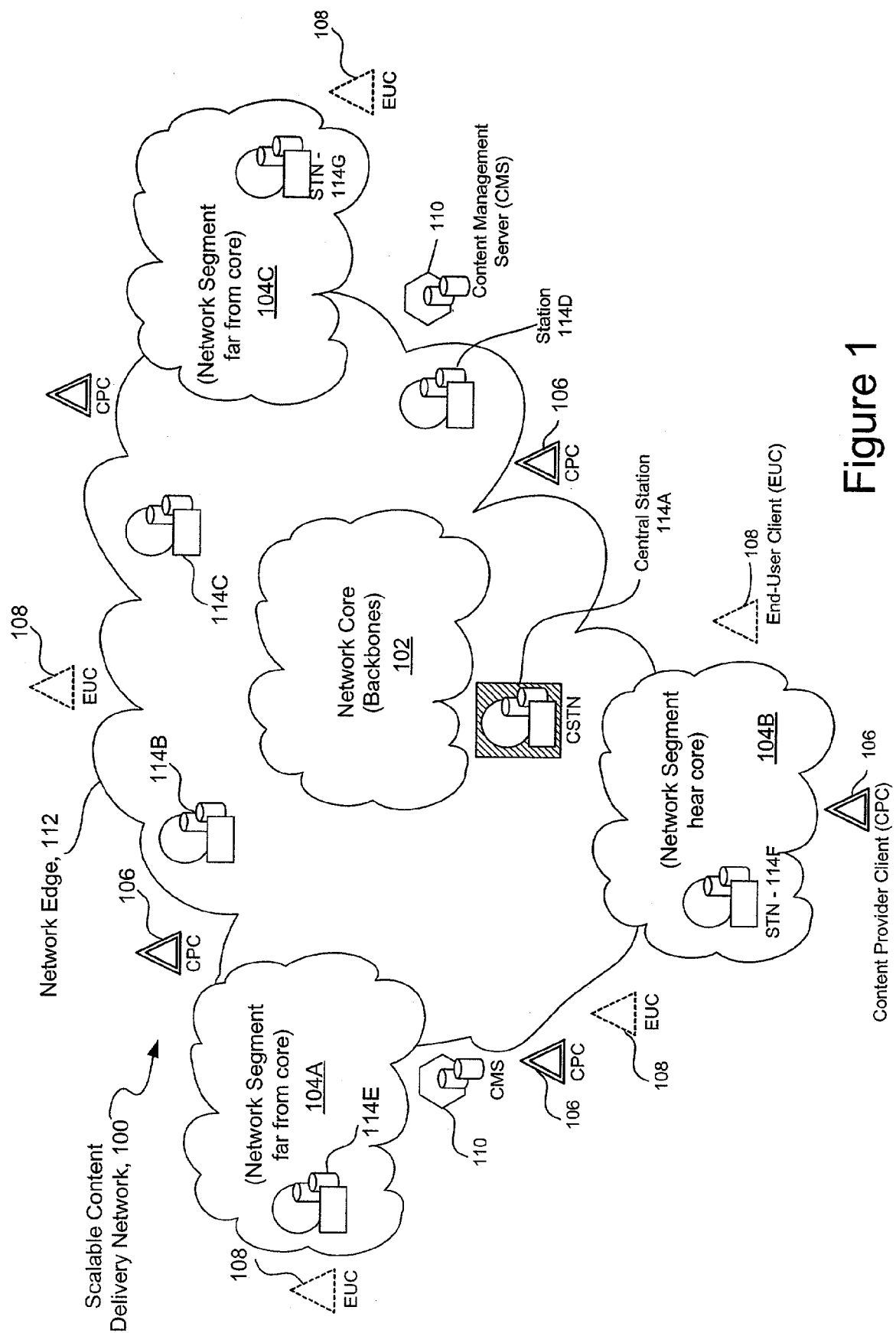
FIG. 1 depicts a scalable content delivery network (SCDN) 100 according to an embodiment of the invention.

The present invention is directed toward a method and system for storing and distributing large files. In particular, the invention provides a highly efficient architecture and technique for processing, storing and serving files such as media content to a user for education, entertainment, business, or any other purpose. A method, system and computer program product according to an embodiment of the present invention create an advanced read-write-able integrated network file system in which directory presentation and data storage are separated. The method and system includes division, distribution, and re-assembling of files without significantly delaying presentation of the content to the user. The invention also includes creation of an integrated file system and distribution of file system objects including volumes, directories, and files.

One embodiment of the invention provides an improved mechanism for dividing and distributing files (referred to as "payload" or "content") throughout a computer network (e.g., an internet such as the global Internet). Another embodiment of the invention provides a method to create an integrated file system view of multiple content nodes (also called stations or distribution centers). Another embodiment of the invention provides a method to distribute, replicate, and synchronize the update of file system objects such as volumes, directories, and files. In the following description, numerous specific details are set forth to provide a more thorough description of embodiments of the invention. The description is not meant to be limiting. For example, reference is made to Internet Protocol and UNIX, but any packet protocol may be used and any operating system may be used.

The term "file" is used herein to mean a collection digital data or information. It is intended for the term "file" to include both a complete file as well as any desired portion of a file. Examples files include word processing documents, books, databases, spreadsheets, digital images (e.g., JPEG, TIF, GIF, bitmaps, etc.), movies (e.g., MPEG files), music (e.g., MP3 and WAV files) and the like, and any portion thereof.

The invention provides end-user systems with a way to access file system objects without overburdening the network utilized by the end-user system to transmit data. In one embodiment, the system accomplishes this by breaking the file into multiple portions (segments or tracks) and storing those portions and other file system objects in locations (e.g., nodes) distributed throughout the network. The file portions and other file system objects stored throughout the network are distributed utilizing a flow optimization technique that provides for the intelligent management of the file system objects and portions of data. Thus, file system objects and portions of the files are stored in locations that minimize the amount of time it takes to deliver the content to the end-user system. These locations minimize the latency associated with delivering the data to the end-user system and are referred to herein as the "edge" of the network.

Each node at the edge of the network that embodies aspects of the invention is configured to appear as if it has the file stored locally when portions of the file are actually stored on other nodes located throughout the network. This greatly increases the virtual storage capacity of each network node without consuming system resources. The nodes distribute and replicate data blocks and other file system objects in a manner that maximizes data transfer efficiency while minimizing bandwidth consumption. When the end-user system issues a request for content (e.g., a file) the request is routed to the nearest node and the node imports non-resident data of the requested content from other nodes in a manner that requires the least time and cost. The end result is that each network node has access to numerous or all file system objects (volumes, directories, and files) without having to locally store and maintain the full content of each of those objects.

The invention provides efficient methods and systems for dividing a file for storage and then reconstructing the file for delivery. The process of dividing a large file is called "chunking" and is described in detail below. The invention also provides a method to create an integrated file system from multiple nodes. The invention further provides a method to distribute, replicate, and synchronize file system objects among a network of nodes, and provides a method and system for clustering a group of virtual file systems. This clustering of a group of virtual file systems increases reliability and availability while increasing I/O bandwidth by load balancing.

Parallel Download is the mechanism employed in the invention's scalable content delivery network (SCDN) to ensure that a demanded file is present at a station in time for user consumption. This mechanism is used in solving the content caching and storage problem for delivering large files such as those encountered in video-on-demand.

In the network, files are divided into smaller units called "tracks" according to the nature of data contained in them. Tracks are further divided into smaller equally sized units called "block files." The term "content component" is used herein to mean one or more block files of a larger file. This division builds the foundation for parallel download which is implemented in two levels: process level and thread level. Note that each process may include a plurality of threads. In the network, a component called distribution server is responsible for fetching the data on-demand in each of the stations. A distribution server coexists with other distribution servers in its station to share the workload of fetching a certain track. All the distribution servers in a station collaborate to fetch the block files together, performing a process-level parallelism. Moreover, an individual distribution server spawns off a number of threads to fetch block files, performing thread-level parallelism.

I. Overview

FIG. 1 provides a view of a scalable content delivery network (SCDN) 100 for delivering large payloads according to an embodiment of the present invention. Network 100 may be a network such as the Internet that conceptually includes a network core 102 (i.e., the backbone), intermediate network segments 104, ranging "near" and "far" from core 102. "Near" and "far" relate to distance and are intended to indicate relative path latencies (short or long, respectively) to core 102, such latencies generally depend on the number of intermediate hubs (e.g., switches, routers, and the like) that are traversed to reach the high-speed backbones that form core 102 of network 100 and through which much of the network traffic is routed. Note that each intermediate hub may perform some limited processing, which adds latency, before forwarding the traffic to the next hub. For purposes of illustration, segments 104A and 104C are indicated as being far from core 102, while segment 104B is indicated as being near core 102.

Network 100 includes a plurality of content provider clients (CPCs) 106, a plurality of end-user clients (EUCs) 108, and one or more content management servers (CMSs) 110, all located beyond network edge 112. This arrangement is illustrative and not intended to be limiting. For example, a content provider client 106, end-user client 108, and/or content management server 110 can be located anywhere in a network, including beyond a network edge, at a network edge, or at any location within a network such as within a network segment 104 or core 102.

A plurality of distribution centers or stations 114 are placed at various locations throughout network 100. Distribution centers 114 are responsible for managing content delivery.

In general, each content provider client 106 may be connected (or assigned) to a content management server 110, which in turn is connected to an assigned distribution center 114. Alternatively, content provider client 106 may be connected (or assigned) to any distribution center 114. In this environment, any connection supported by the network 100 can be used. Examples of such connections include, but are not limited to, a physical link (over any media wired or wireless), data link, logical link, permanent virtual circuit, switched virtual circuit, connection-oriented protocol, connectionless protocol, or any other direct or indirect network connection and/or protocol and combinations thereof.

Content provider client 106 may be an application for managing contents in the network, or it may be a general file system client that connects to a virtual file control system (not shown) in a distribution center 114. A content owner creates, renames, moves, deletes, and manages volumes and directories through a respective content provider client 106. A content owner also uploads, reads, updates, and manages files in network 100 through his or her content provider client 106. End-user client 108 provides an end-user of the content access to files in network 100. For example, end-user client 108 may be any kind of browser (including but not limited to a web browser or any file system browser) running on an end-user's local device. Any type of end user device that can support an end-user client 108 can be used including, but not limited to, a computer (e.g., a personal computer, workstation, or server), set-top box, television set, telephone, or a hand-held computing device (e.g., organizers, personal data assistants, palm-top devices, and the like).

Network edge 112 may be far from network core 102. However, the distance (i.e., path latency) between the core and the edge may not be uniform, and may vary considerably for a given content provider client 106 or end-user client 108. One embodiment of the present invention places a plurality of distribution centers (DC) 114A–114G for maintaining payloads at edge 112 of network 100 thereby reducing or eliminating latency for respective end user clients 108. Payload content from a content owner is pushed from one distribution center 114 to other distribution centers 114 at edge 112 of network 100. An end-user seeking access to particular payload content is serviced (via a network file system client or an application server) from the nearest distribution center 114 containing the desired content. Latency due to path considerations is minimized since content is distributed to the end-user (e.g., to a respective end-user client 108) via a plurality of distribution centers 114 located at network edge 112. Thus, distribution involves obtaining any file system objects from a content provider client 106 and geographically placing these objects or portions of each objects at distribution centers 114 which are generally located close to the edge of the network.

Figure 2:
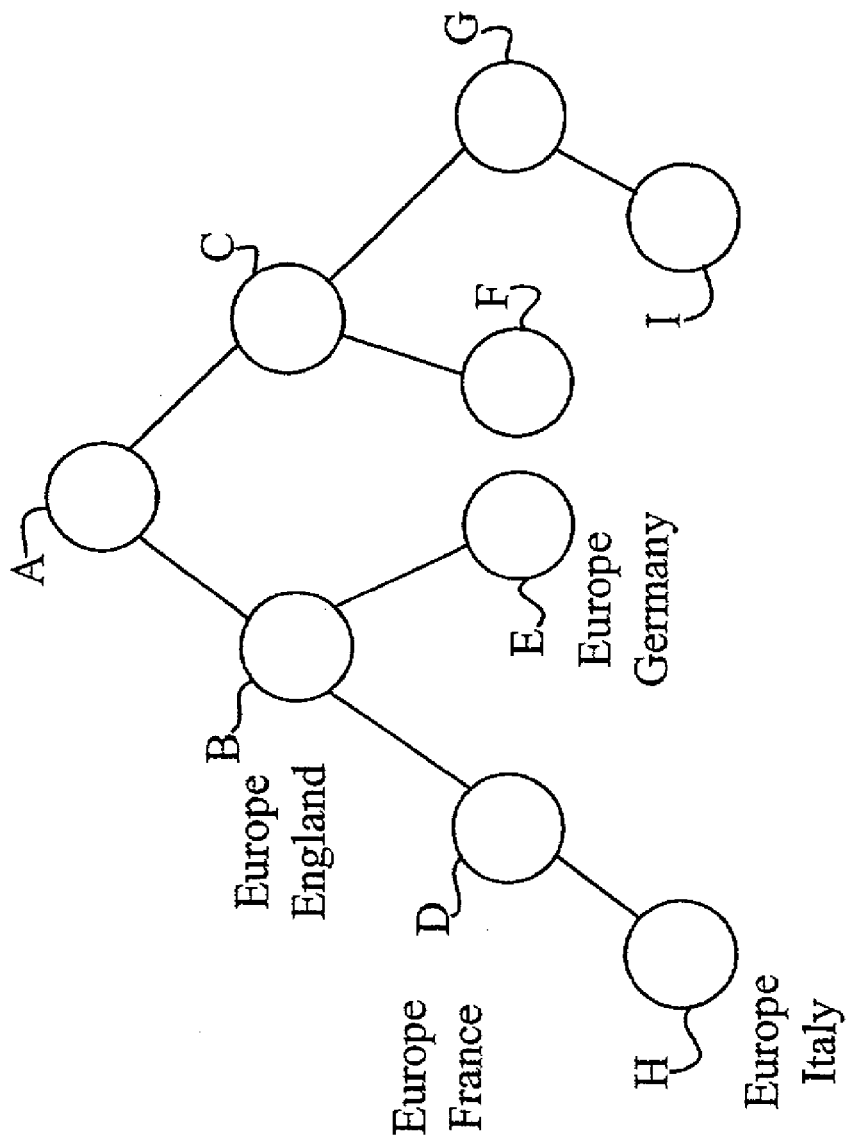
FIG. 2 is illustrates the hierarchical tree structure in which the nodes of network 100 are arranged according to an embodiment of the invention.

The distribution centers 114A–114G in network 100 of FIG. 1 are virtually arranged in the form of a tree as illustrated in FIG. 2, for example. This virtual tree arrangement is primarily used for communication of control information and signals amongst the nodes (i.e., distribution centers 114) of network 100. Data downloads can be performed from any node in the network having the desired data, preferably the nearest node (network-distance-wise). Nodes A through I of FIG. 2 represent a plurality of distribution centers 114 (e.g., distribution centers 114A–114G plus two others, nodes H and I). The nodes are arranged in a logical order. For example, assuming node B represents Europe-England, then logical child nodes in Europe might be Europe-France (e.g., node D) and Europe-Germany (e.g., node E), and a child node of Europe-France might be Europe-Italy (e.g., node H). In this example, where the left side of the tree represents Europe, the right side may represent Asia. Node A is the root node and may represent a central control station (e.g., central control station 114A in FIG. 1).

As described below, when a distribution center 114 is requesting block files from other distribution centers 114, the hierarchical tree structure is used to efficiently transfer data between the distribution centers while limiting the number of nodes to which a request must be sent. For example the attributes (e.g., location, access rights, parent and child nodes in the tree, general content, etc.) of a distribution center are known to all other distribution centers. Similarly, any file request includes distribution criteria (e.g., file type, expiration, etc.) of the requested file. This permits each distribution center to compare attributes and only forward file requests through the tree structure to appropriate distribution centers. For example, a file having a distribution criteria that includes "U.S. Only" need not be sent to a distribution center located in Europe and having the attribute "Europe."

In one or more embodiments, each node in the tree has a unique attribute set representing the name of the node. The attribute set for a node is stored in the node and can be represented in any convenient data structure. For example, the attribute set can be represented as a variable bitmap (a bitmap is the binary representation of an object, e.g., a number). Each node also contains a representation of the attribute set of each of the node's children, grand children, great grandchildren, etc. (i.e., all nodes emanating from that node as a root node—lineal descendants). This representation is called the "Rolled Up Set of Attributes" and any convenient data structure can be used to store it. Thus, the rolled up attribute of a node is the representation of the rolled up attribute of its children. For example, a "Rolled Up Bitmap," which is a combination of the rolled up attribute bitmaps of all the node's children, may be used. A "Rolled Up Bitmap" may be defined as the "binary OR" (a.k.a. Bitwise OR) of the rolled up attributes of the node's children.

FIG. 3 is an illustration of the attribute bitmap and rolled up bitmap, in accordance with an embodiment of the present invention. Bitmaps 300, 310, 320, 330, 340 and 350 use 16 bits for illustration purposes but since the bitmaps are variable, they may vary as needed to identify each node and provide other necessary information. Bitmap 300 represents the attribute set for node B of FIG. 2 and has, as its identification, bits 1, 4 and 13 set to one and all other bits set to zero. Bit 1 is set to indicate that node B is a child node of A, bit 4 is set to represent Europe, and bit 13 is set to represent England, for example. Bitmap 310 represents the attribute set for node D of FIG. 2, a child node of B, and has bits 1, 4, and 14 set to one and all other bits set to zero. Bit 14 represents France, for example. Bitmap 320 represents the attribute set for node E of FIG. 2, also a child node of B, and has bits 1, 4, and 15 set to one and all other bits set to zero. Bit 15 may represent Germany, for example. Bitmap 330 represents the attribute set for node H of FIG. 2, a child node of D, and has bits 1, 4, and 16 set to one and all other bits set to zero. Bit 16 may represent Italy, for example. As discussed previously, the rolled up bitmap for node D (e.g., 340) would be the attribute bitmap of node H (since H does not have any children) and the rolled up bitmap of node B (e.g., 350) is the binary OR of Bitmaps 310, 320, and 330. The result of the binary OR is that all the bits set in Bitmaps 310, 320, and 330 are also set in Rolled Up Bitmap 350 (i.e., bits 1, 4, 14, 15, and 16).

Content management servers 110 may be connected to any node on the tree. Thus, although a content management server 110 and a distribution center 114 will typically not be collocated, content management server 110 gives the content owner a vehicle to introduce file system objects to distribution centers 114 and to manage the file system objects in network 100. Content management client 106 may be connected directly to a distribution center 114 to perform similar functions that are provided by a content management server 110. In one embodiment, content management server 110 is a computer that processes the content owner's file system objects for distribution in network 100. In another embodiment, the content management server 110 may, for example, be a subset of tools (e.g., machine independent objects) that allow management, distribution, access, and control of the file system objects in network 100; thus, the tools may be embedded in the content owner's computer for processing and distribution of the large payload file in the network. In yet another embodiment, content provider client 106 may be a standard file system client that connects directly to the virtual file control system of a distribution center 114 while the processing tools may be embedded within the virtual file control system. After a content provider client 106 loads a file system object into a content management server 110, content management server 110 may process the object and forward it to a distribution center 114.

II. Distribution Centers

Figure 4:
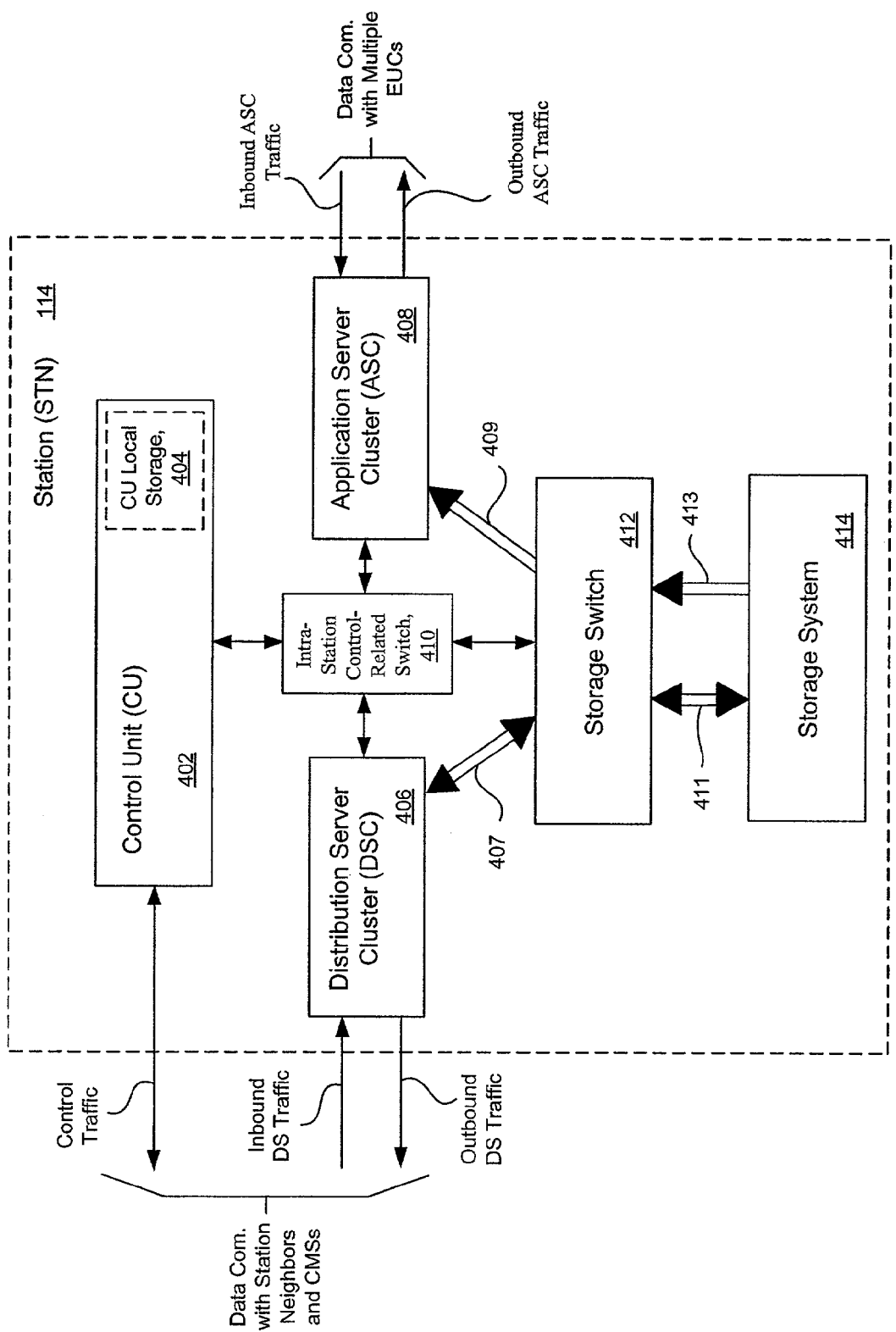
FIG. 4 is a block diagram of a distribution center 114 according to an embodiment of the invention.
Figure 5:
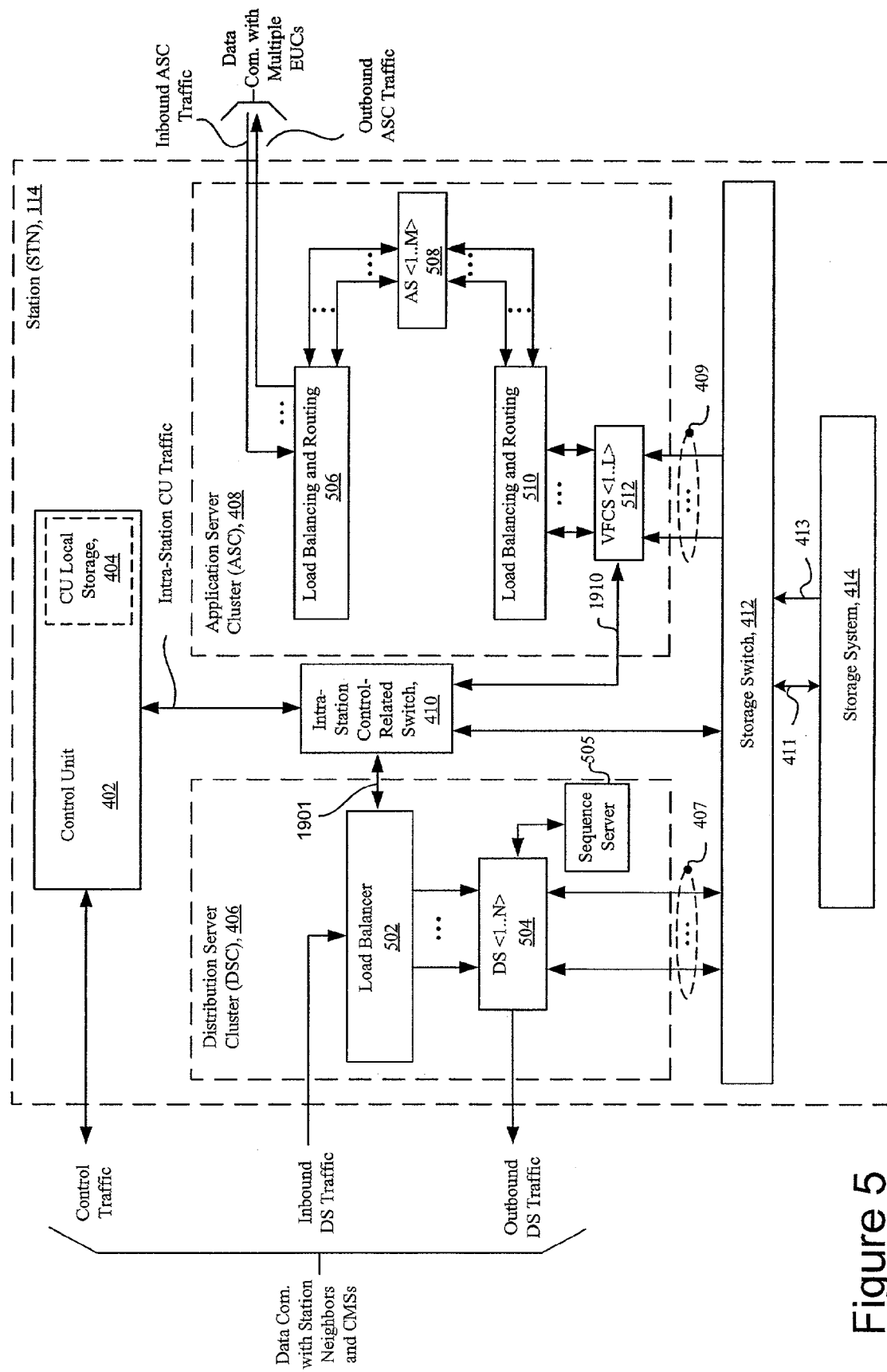
FIG. 5 is a more detailed block diagram of a distribution center 114 according to an embodiment of the invention

FIGS. 4 and 5 show a representative distribution center 114. Note that distribution center 114 is also called a station (STN) or data center. Distribution center 114 includes a distribution server cluster (DSC) 406, an application server cluster (ASC) 408, a control unit (CU) 402, a shared storage system 414, a storage switch 412, and an intra-station control related switch 410. Control unit 402 includes a local storage 404. The distribution server cluster 406 communicates with storage system 414 through storage switch 412 using communication links 407 and 411. The application server cluster 408 communicates with storage system 414 through storage switch 412 using communication links 409 and 413. The control unit 402, distribution server cluster 406, and application server cluster 408 all communicate through intra-station control related switch 410, which communicates with storage switch 412.

A. Application Server Clusters

As shown in FIG. 5, application server cluster 408 includes load balancing and routing block 506, a plurality of application servers 508, load balancing and routing block 510 and virtual file control system (VFCS) server 512. In a first embodiment, application servers 508 are not actually part of distribution center 114 but are merely illustrated this way for ease of explanation. In this embodiment, application servers 508 are typically collocated with a distribution server 114 in a data center. Application servers 508 are users of network 100 of the invention. For example, application servers 508 may be streaming video servers. Distribution center 114 acts as an interface to the streaming video servers. In this example, the streaming video server would actually use distribution center 114 and network 100 to retrieve the content (or media payload) to be delivered. Similarly, load balancing and routing block 506 would also typically not be part of distribution center 114 but would be external and would manage traffic coming into the application servers.

In a second embodiment, application servers 508 are implemented in software and may actually be part of distribution center 114.

VFCS servers 512 receive file requests from application servers 508 via load balancing and routing block 510. VFCS servers 512 then provide an interface to distribution server cluster 406 to fetch requested files. The requested files are then returned to application servers 508 via VFCS servers 512. In this manner, distribution center 114 acts as a file or directory system for application servers 508.

B. Distribution Server Clusters

As shown in FIG. 5, a plurality of Distribution Servers 504 may be clustered together in a distribution center 114 to balance their workload. Distribution server cluster 406 provides, among other things, system fault tolerance and scalability. Although there are multiple Distribution Servers 504 in one distribution center 114, they appear as one interface to other distribution centers. A Load Balancer 502 provides an interface for distribution servers 504 to the outside network. Load balancer 502 dispatches requests to distribution servers 504 with awareness of the current workload of each.

Figure 6:
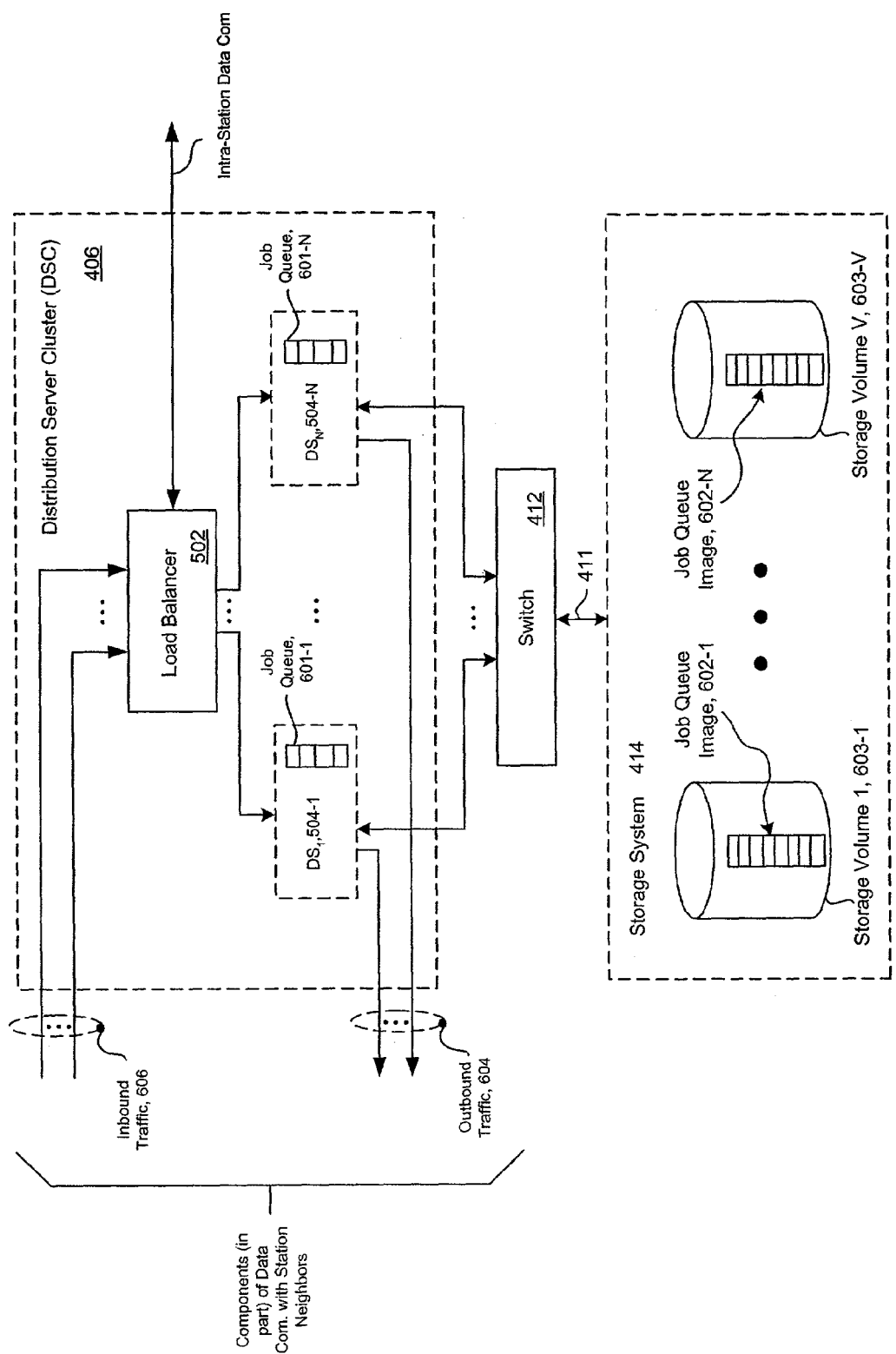
FIG. 6 is a block diagram illustrating a distribution server cluster 406 according to an embodiment of the invention.

FIG. 6 is an illustration of a distribution server cluster 406. Distribution server cluster 406 includes a plurality of Distribution Servers 504-1 through 504-N (collectively, 504) and a Load Balancer 502. Each distribution server 504 accesses data (e.g., Block Files) on Storage Volumes 603-1 through 603-V (collectively, 603) in shared Storage System 414 via Switch 412. A Distribution server 504 (e.g., Distribution server 504-1) in distribution server cluster 406 may issue a request (e.g., a search request) to a Distribution server 504 of a neighboring distribution center 504 via requests that are components of Outbound Traffic 604. Similarly, a Distribution server 504 of a neighboring distribution center 114 may issue a request (e.g., a learn request) to a distribution server 504 within distribution server cluster 406 via requests that are components of Inbound Traffic 606. Load Balancer 502 dispatches Inbound Traffic 606 to one of distribution servers 504-1 through 504-N. Load Balancer 502 may be implemented as a load balancing router in various topological combinations with a standard router and may also handle outbound traffic 604 from distribution server 504.

Each distribution server 504 treats its requests (search, learn, etc.) as jobs to be executed. The jobs are stored and managed in job queues 601-1 through 601-N (collectively, 601) in memory (e.g., random access memory) of each respective distribution server 504. Job queue images 602-1 through 602-N (collectively, 602) corresponding respectively to job queues 601-1 through 601-N, are stored in a database in the storage system 414. As discussed below, the distribution center's control unit 402 manages this and a number of other databases in storage system 414. Note that the database containing job queue image 602 is mapped onto storage volumes 603 merely for convenience in making the illustration. It should be apparent to those of ordinary skill in the art that the job queue image database and other network 100 related databases may be mapped onto any available storage volume.

Each distribution server 504 periodically registers a "heartbeat" in a control unit database in storage system 414. Periodically, each distribution server 504 will check the database for the heartbeats of other distribution servers. During startup (e.g., power-up), each distribution server 504 in a distribution server cluster 406 vote for a "master server." If, for example, distribution server 504-1, misses h heartbeats, where h is a configurable parameter, it is assumed that Distribution server 504-1 is no longer functioning. The master server then re-distributes the jobs associated with distribution server 504-1 to the active (i.e., living) distribution servers 504 within distribution server cluster 406. If the master server ceases to function, all the living distribution servers 504 vote for a new master server. The new master server then re-distributes the previous master server's orphaned jobs, if any exist.

In the event that a control unit database is no longer accessible, the distribution servers 504 function as usual except that their job queues are mirrored to a local storage unit (not shown) of each individual distribution server 504. During this time, it could happen that either a distribution server's job queue database cannot be accessed or a distribution sever crashes. If either event occurs, the particular distribution server would eventually need to be re-started. It would then read and recover all the jobs saved in its local storage (i.e., storage system 414) prior to the failure.

III. Distribution and Retrieval of Files

Parallel download is the mechanism employed in network 100 to ensure that a demanded file is present at a distribution center 114 in time for user consumption. In parallel download, files are divided into smaller units called "tracks" according to the nature of data contained in them. Tracks are further divided into smaller equally sized units called "block files." This division builds the foundation for parallel download which is implemented in two levels: process level and thread level. Distribution servers 504 share the workload of fetching a certain track. All the distribution servers 504 in a distribution center 114 can collaborate to fetch the block files together, performing a process-level parallelism. Moreover, an individual distribution server 504 can spawn off a number of threads to fetch block files, performing thread-level parallelism.

Figure 7:
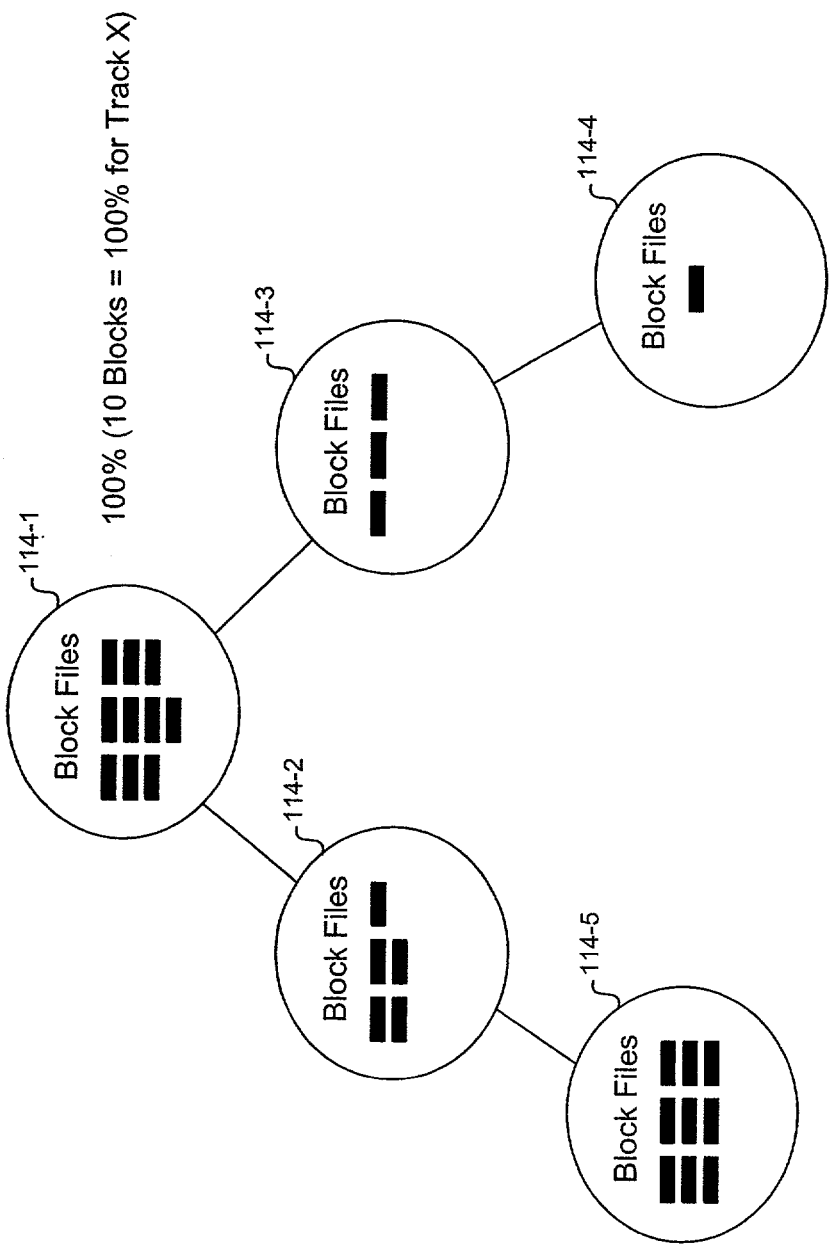
FIG. 7 depicts distribution of files in terms of block files across multiple distribution centers 114 in network 100 according to an embodiment of the invention.

In order to minimize storage usage, files are not stored as a whole in each distribution center 114. For each track, only a few of its block files are pre-staged. The remainder of the block files is fetched on demand from other distribution centers 114 that have the block files. This concept is illustrated in FIG. 7. In FIG. 7, a track of a certain file has been divided into block files and distributed to five distribution centers 114-1 through 114-5 in network 100. The proportion of distribution is different among the distribution centers 114 because of the different viewing patterns of this particular file at each distribution center. For example, distribution center 114-1 stores all ten blocks of the file while station 114-4 stores only a single block.

In operation, if distribution center 114-1 is called upon to deliver the file, it can do so without delay because all blocks are stored locally. Similarly, while distribution center 114-2 has locally stored only the first five blocks of the file, it can also deliver the file without long delay. This is accomplished by delivering the first five blocks (which are stored locally in distribution center 114-2) while the remaining five blocks are fetched from distribution center 114-1. The other distribution centers 114 operate similarly. For example, distribution center 114-4 delivers the sole locally stored block file while the other nine block files are fetched from one or more other distribution centers 114.

A. File Distribution Protocol (FDP)

Figure 8:
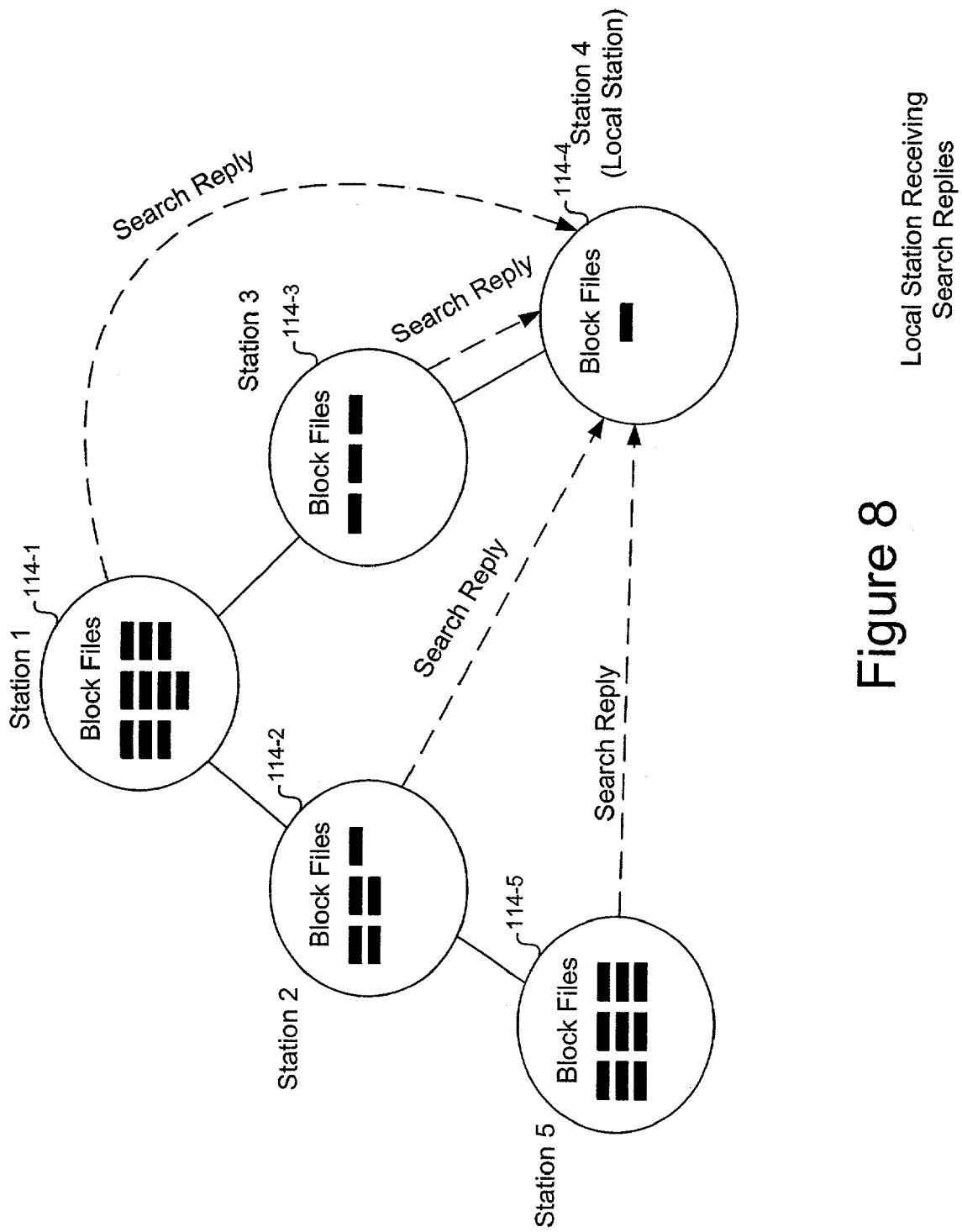
FIG. 8 depicts the management of block files across multiple distribution centers 114 in network 100 according to an embodiment of the invention.
Figure 9:
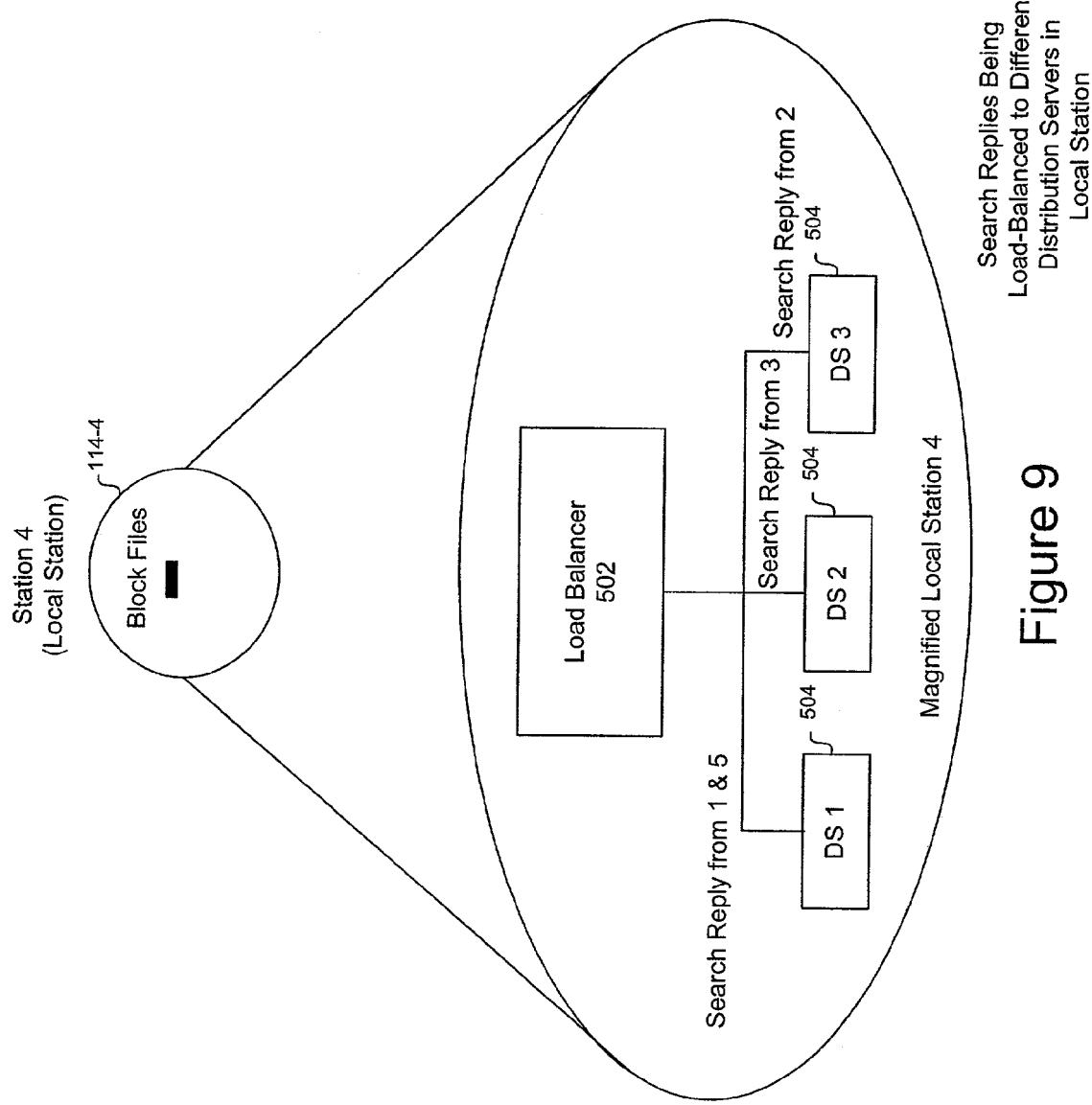
FIG. 9 illustrates how search replies are load balanced to different distribution servers 504 in a distribution center 114 according to an embodiment of the invention.
Figure 10:
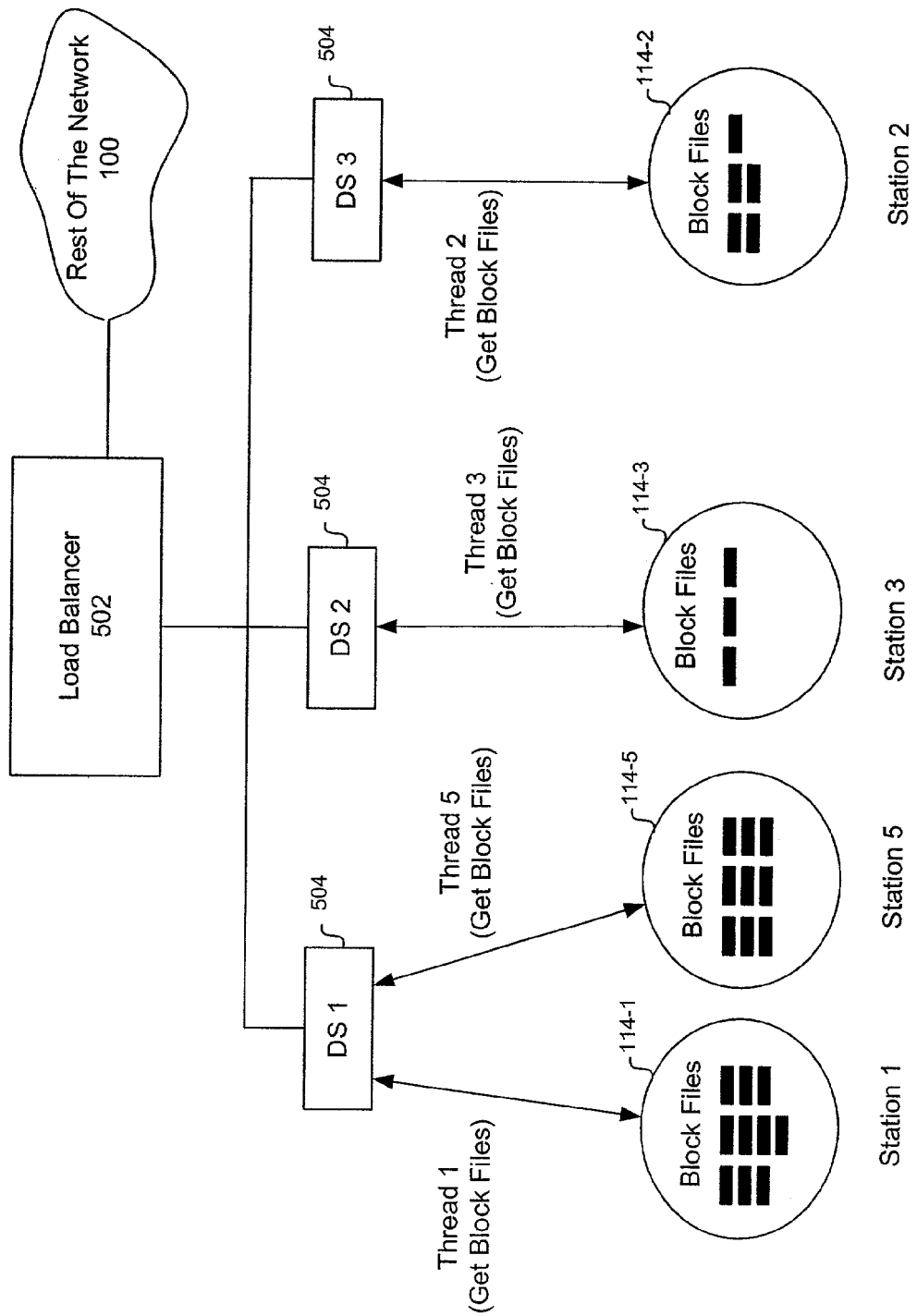
FIG. 10 illustrates how parallel download is performed by distribution servers 504 according to an embodiment of the invention.

Distribution centers 114 in network 100 communicate with one another via a protocol called the file distribution protocol (FDP). A subset (i.e., prepare, search, and get) of FDP is involved in parallel download. FIGS. 8–10 illustrate how distribution centers 114 in network 100 communicate with on another by using FDP to exchange data.

First, a PREPARE request is generated by a virtual file control system (VFCS) server 512 in application server cluster 408 (see FIG. 5) in response to a user request. The PREPARE request is sent from VFCS server 512 to distribution servers 504 via switch 410. The PREPARE request triggers a distribution server 504 to spawn a thread to search for missing block files of a track of a certain file. If a PREPARE request is issued for the entire file, the distribution server 504 that serves the request will spawn as many threads as the number of tracks in that particular file to fetch the block files of each track separately. Each thread then will send out a SEARCH request to network 100 asking for replies from distribution centers 114 that have the desired track stored. The replies that come back from other distribution centers 114 will encode a range of block files that they possess for the desired track. The replies may arrive at any of distribution servers 504 in a distribution server cluster 406, not necessarily just at the original distribution server 504 that sent the search.

A distribution server 504 that receives a search reply will then send a GET request to a distribution center 114 that replies, requesting that the replying distribution center 114 send the range of block files that the replying distribution center possesses. This is illustrated in FIG. 8 which shows, for example, requesting distribution center 114-4 receiving search replies from distribution centers 114-1, 114-2, 114-3 and 114-5. For each search reply it receives, distribution server 114-4 spawns a thread to fetch the block files from the responding distribution center 114. Since distribution centers 114 in the network may have overlapping ranges of block files for a certain track, there is a possibility that many of the search replies may be for the same range of block files. A sequence server 505 (see FIG. 5) ensures that only one thread attempts to download a particular block file from any other distribution center.

Since load balancer 502 load balances the search replies sent by the different distribution centers 114, the search replies would be evenly routed to different distribution servers 504 on the same distribution center 114. This is illustrated in FIG. 9. In the case that a search reply arrives at a distribution server 504 other than the initiator of the search request, the recipient distribution server 504 will automatically fetch block files from the distribution center 114 that replies with the assumption that one of the distribution servers 504 on the same distribution center initiated the search. This distribution server, thus, may be fetching block files in parallel with the other distribution servers, which also have received search replies to the same request. Details of how different processes and threads use sequence server 505 to divide among themselves the workload of fetching the block files pertaining to a track are described below. All the distribution servers 504 that receive search replies collaborate to fetch the block files until all the needed block files are downloaded. This is illustrated in FIG. 10.

B. Block File Parallel Download

The block files provide a sufficient granularity for distribution servers 504 to share their load. A block file lock mechanism is employed by a thread to claim the right to fetch a block from a remote distribution center 114. Each of these block files can be locked on a global level with respect to every thread on all of the distribution servers 504 in one distribution center 114. When commissioned to fetch the same range of block files, the different threads on distribution servers 504 first attempt to obtain a lock for the next missing block file. If a thread succeeds in obtaining the lock, it proceeds to fetch the block from the peer distribution center that sent the search reply. If a thread fails to obtain a lock for the next missing block file, it means that there is either another thread in its own process or another distribution server 504 that has obtained the lock. In the event of encountering a lock, the thread proceeds to attempt obtaining a lock for the next missing block file.

Figure 11:
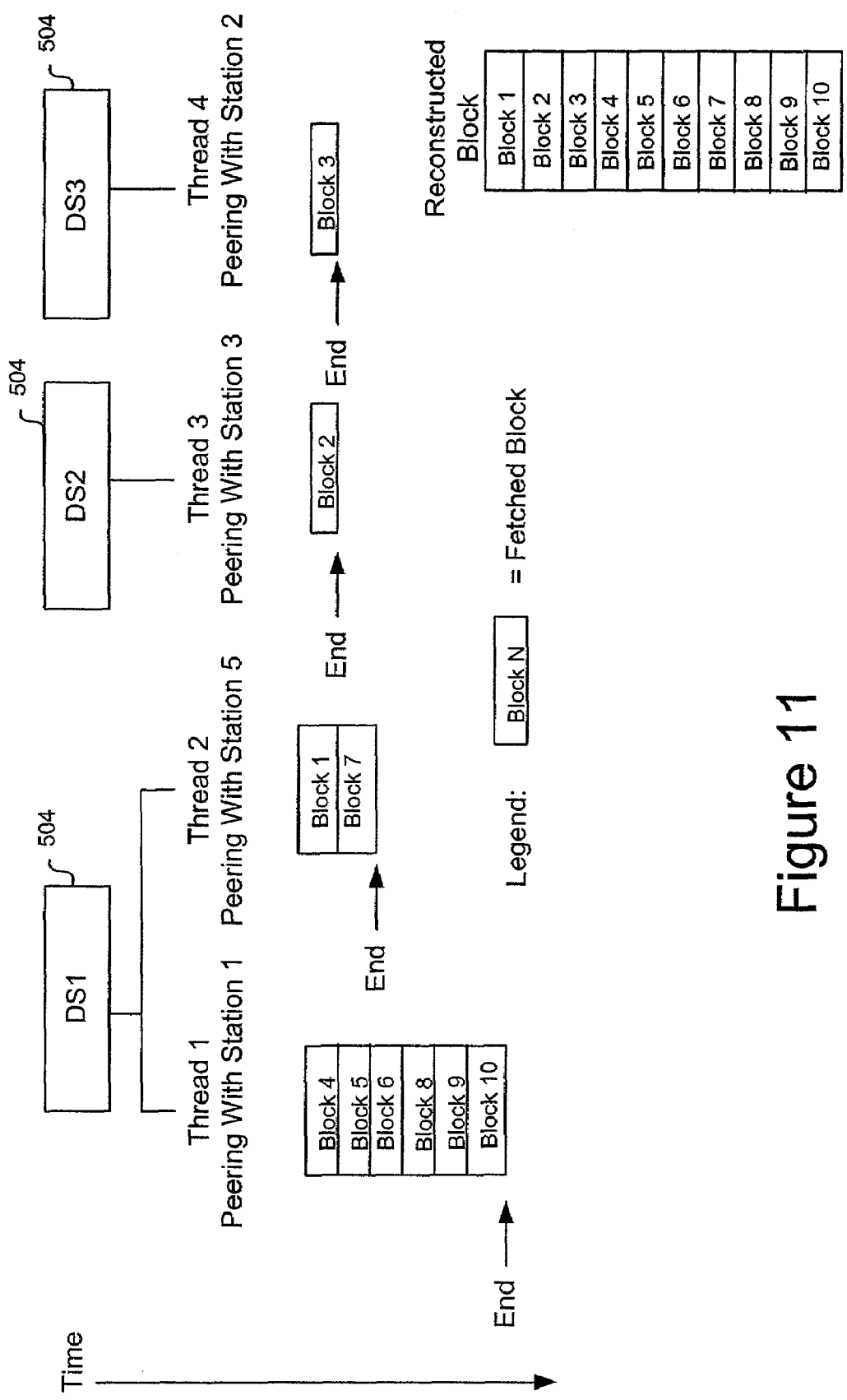
FIG. 11 shows a timeline for a block file download according to an embodiment of the invention.

FIG. 11 is a timeline that illustrates how different processes share their load. In this context, a process can include a thread or similar operation. Note, that because a process can include one or a plurality of threads, the terms "process" and "thread" are used interchangeably when discussing the functions carried out by a thread or process. For ease of illustration, it is assumed that the search replies come at approximately the same time. As illustrated, distribution server DS1 receives two search replies. Distribution servers DS2 and DS3 both receive one search reply. For each reply, a thread is spawned off to peer with a replying distribution center 114. The threads then cooperate to download the block files from the peering distribution centers 114. Note that thread 1 fails to compete for block files 1, 2 and 3 because threads 2, 3 and 4 are faster in terms of acquiring the lock. Thread 1 wins the locks for blocks 4, 5, 6, 8, 9 and 10 and downloads them. Thread 2 succeeds in acquiring only the lock for block files 1 and 8. The fastest thread, thread 1, does the majority of the downloading.

C. File Serving Operation

Figure 12:
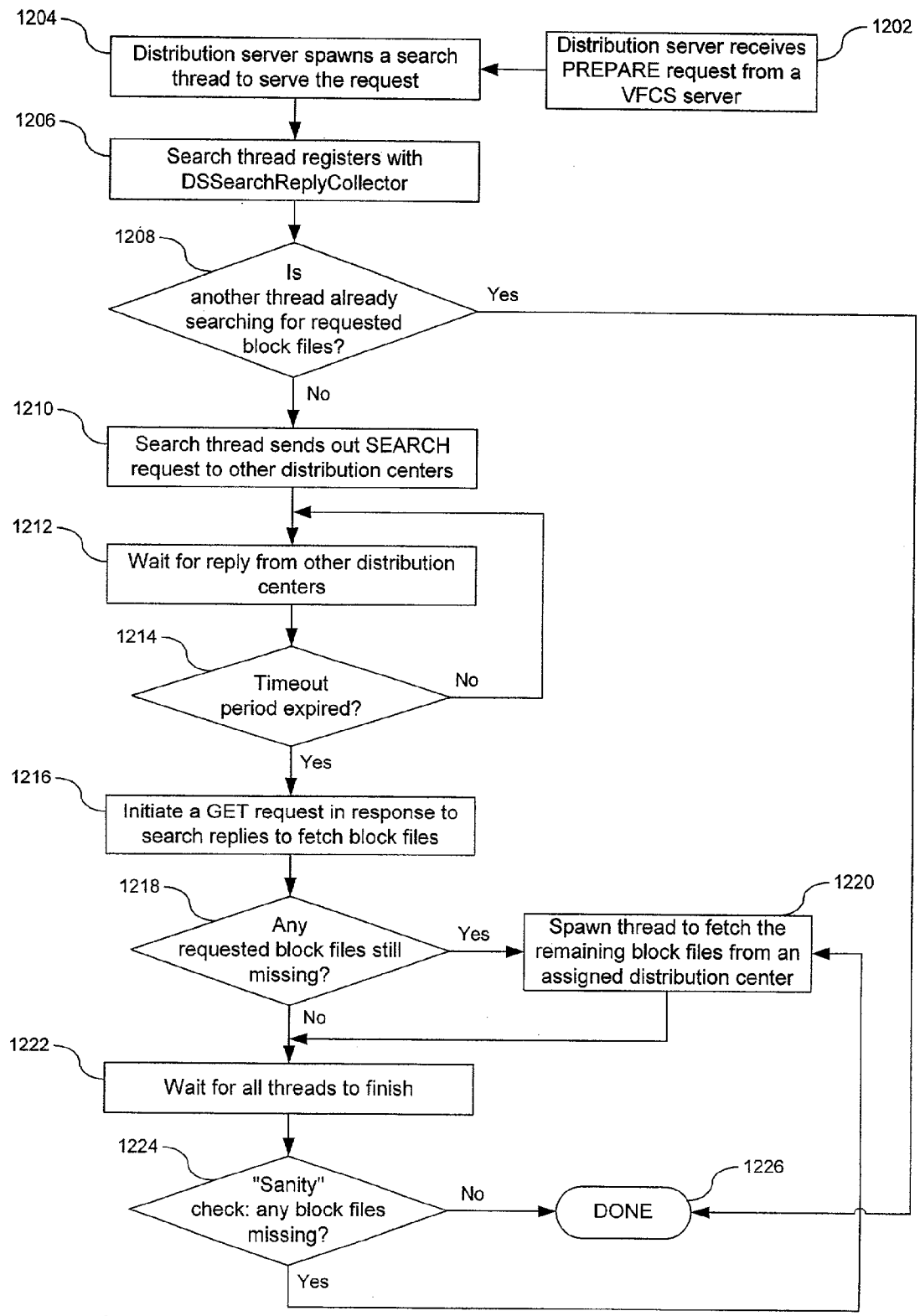
FIG. 12 is a flowchart depicting the steps for retrieving the block files of a payload file for reassembly according to an embodiment of the invention.

FIG. 12 is a flowchart depicting steps for serving the files according to an embodiment of the invention. In a step 1202, a distribution server receives a PREPARE request from a VFCS server 512 (in response to a user request). In a step 1204, the distribution server 504, in response to the PREPARE request, spawns a thread to serve the request. In a step 1205, the thread registers with another thread in distribution server 504 called DSSearchReplyCollector. Based on DSSearchReplyCollector, distribution server 504 determines (at step 1208) whether there is already another thread serving a previous request that covers the range of block files that has been requested. If so, the PREPARE request is dropped and the method ends at step 1226. Otherwise, the thread is deemed valid, and the method proceeds to step 1210.

At step 1210, the thread sends out SEARCH requests to other distribution centers to search for the block files that were requested. At step 1212, the thread waits for replies to the SEARCH requests. At step 1214, the wait interval is compared to a predetermined timeout period. If the timeout period has ended, the method proceeds to step 1216. Otherwise, the thread continues to wait. The timeout period is used to gauge whether a search request has taken too much time to get any replies. This situation can happen if the other distribution centers that have the desired block files are very distant from the searching distribution center or if the search replies are all routed to other distribution servers 504 in the cluster 406.

In a step 1216, GET requests are initiated to fetch the requested block files from the replying distribution centers. A new thread is initiated for each GET request. Note that in a preferred embodiment, step 1216 may be performed prior to step 1214. That is, the GET requests may be initiated even through the search thread is still waiting for additional replies from distant distribution centers.

At step 1218, it is determined whether any requested block files are still missing. That is, if the timeout period has ended and the whereabouts of some block files are still unknown, the search thread takes action to fetch the remaining block files from an previously designated distribution center that is known to have the desired block files. This is indicated at step 1220. In the event that other distribution servers 504 have gotten the search replies, the local threads will cooperate with the threads in those distribution servers 504 to perform parallel download. In both cases, step 1222 waits for all threads to finish.

In order to be fault tolerant to situations such as failure of a distribution server 504, a "sanity" test is applied at step 1224 after return of the threads that were spawned to fetch block files. If there are any missing block files caused by a failed distribution server the thread will spawn a new thread to fetch the missing blocks from an assigned distribution center 114. This is indicated by a return to step 1220.

After all requested block files have been fetched, the method ends at step 1226.

IV. Sequence Server

In each distribution center 114, there are many concurrent processes or threads. For example, there are multiple VFCS (virtual file control system) servers 512 running on different physical machines in an application server cluster 408, and each VFCS server 512 has multiple threads. Similarly, there are multiple distribution servers 504 running on different physical machines, with each distribution server 504 having multiple threads. These multiple threads and processes often need atomic access to shared data. For example, when multiple distribution server 504 threads are downloading block files, it is preferred that only one thread download the same block file.

If the threads or processes are running on a single machine, one can use locking mechanisms provided by the operating system, such as mutexes or semaphores, to achieve atomicity. However, such locking mechanisms do not work across a cluster of machines. Although file locks provided by a shared file system could be used as a locking mechanism across a cluster, the commonly used Network File System (NFS) does not have reliable file locking. If we use a separate lock-manager process that grants locks to threads, it is difficult to handle failure situations such as when a client acquires a lock and then dies. In a preferred embodiment of the invention, sequence server 505 provides a lock-free approach for threads and processes running on different machines in a cluster to have atomic access to data. The lock-free access facilitates failure handling.

A. Sequence Server Description

As discussed above, sequence server 505 provides a lock-free mechanism for multiple threads or processes running on different machines to access data atomically. It allows clients to gain sequential access to data or to find out whether the sequence has been violated so that the clients can retry their operation or take corrective action. The sequence server achieves this by associating a random "sequence number" with each shared data item. When a client asks sequence server 505 for the value of the shared data item and indicates its intention to modify the value, sequence server 505 increments the sequence number associated with the data and returns to the client the data as well as the (incremented) sequence number. The client modifies the data value and returns it back to the sequence server 505 together with the sequence number. The sequence server 505 then compares the returned sequence number with the sequence number it currently has for that data item. If the number is different, it means that some other client had, in the meanwhile, requested the value of the data item with intention to modify it. In other words the first client's sequence had been violated: it did not have exclusive access to the data during the time it tried to perform a read-modify-write operation. The sequence server 505 therefore rejects the update request from the first client and informs the client of the sequence violation. The first client then has to take corrective action as necessary. Depending on the context and the convention among clients, it could either retry the operation by again requesting a new read and a new sequence number, or it could just let the other client perform the operation.

Figure 13:
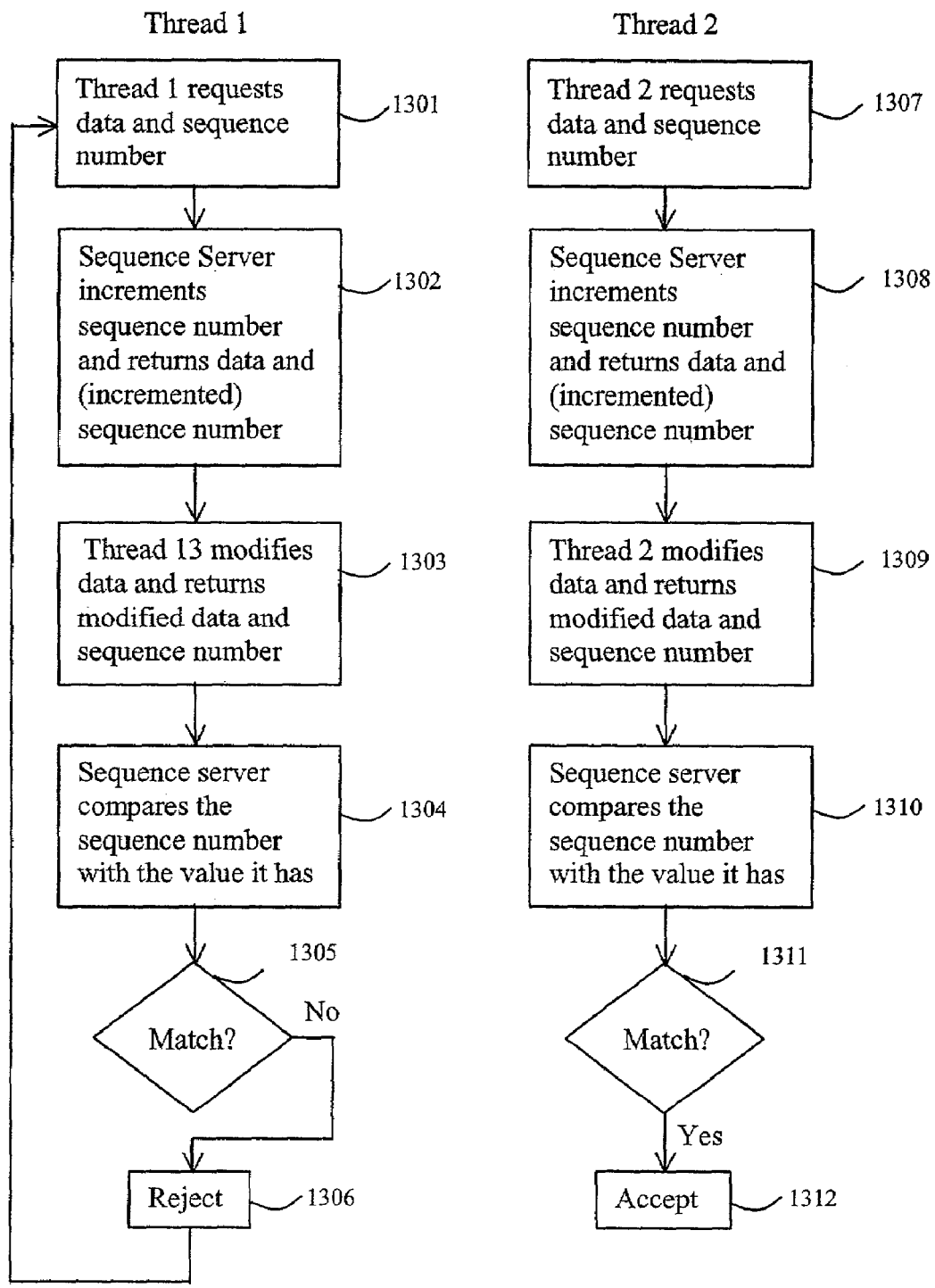
FIG. 13 is a flowchart illustrating operation of a sequence server according to an embodiment of the invention.

FIG. 13 is a flowchart that illustrates how two threads use sequence server 505 to perform an atomic read-modify-write operation on a shared data item. Steps 1301–1306 represent a first thread, and steps 1307–1312 represent a second thread. In steps 1301 and 1307, both threads request from sequence server 505 the data and a sequence number. In response to the request from Thread 1, sequence server 505 increments the sequence number and returns the data and sequence number first to Thread 1 (step 1302). Then, in response to the request from Thread 2, it again increments the sequence number and returns the data and new sequence number to Thread 2 (step 1308). As a result, both threads have the data, but different sequence numbers.

Next, as indicated at steps 1303 and 1309, both threads modify the data and return the modified data and the sequence number that they were given. At steps 1304 and 1310, sequence server 505 compares, to the current value, the sequence numbers returned by the threads. If the sequence numbers matches, as in the case of Thread 2, the sequence server 505 accepts the new data (see steps 1311 and 1312). If the sequence numbers do not match, as in the case of Thread 1, the sequence server 505 rejects the new data (see steps 1305 and 1306). Thread 1 then goes back to Step 1301 and retries the series of steps. In this manner, the atomicity of the read-modify-write operation for each thread is guaranteed.

An example is provided below to explain both the need for atomic access and operation of sequence server 505. For background, when a file is to be stored, there is a process called file "chunking" that divides the file into blocks and metadata that describes the blocks. Chunking is described in additional detail in U.S. Pat. Ser. Application No. 09/681,665, filed May 17, 2001, which is incorporated herein by reference. Distribution server 504 updates the metadata associated with a block file in a manner that is consistent with the status of the real data. In other words, at any instant in time, the metadata must accurately represent reality. Otherwise, during the (small) interval in which the metadata does not reflect reality, there is a risk that another thread may access the inaccurate metadata and take incorrect action.

In one example, distribution server 504 assigns a storage index to each block file. The storage index is used to determine the full path to the file. This concept is used to allow different block files to be stored on different storage devices for higher performance. If there are n storage devices, for example, the storage indexes run from 1 to n, and distribution server 504 assigns indexes to block files in a way as to balance the load among the storage devices. In one embodiment, load balancing is achieved using a round-robin distribution.

Furthermore, in this example, distribution server 504 uses the following convention: a storage index of zero means that the block file is not present on disk; a negative storage index means that the block is either being written or deleted, but the operation is not complete (in other words, it is busy, and others shouldn't use it at this moment); and a positive number means that the block file is available on disk and the number can be used to determine the full path name of the file.

In the absence of a sequence server, the algorithm to download and save a block file (by a distribution server 504) into a group of local storage volumes in storage system 414 would be as follows:

```
read storage index for this block
if index is 0  { /* block not present */
    i = get_new_index()
    set index = -i  /* negative means busy */
    download block file
    again check storage index  /* in case another thread is
    also doing the same thing */
    if index is -i {
        set index to +i
    }
    else {
        delete the file  /* because some other thread is
        also downloading it */
    }
}
```

Note, if two threads run the above algorithm for the same block file, the following sequence of events could occur:

| THREAD 1 | THREAD 2 |
| --- | --- |
| Read storage index=0 | Read storage index=0 |
| Generate new index, say 1 | Generate new index, say 2 |
| Set storage index = −1 | |
| Download file | |
| Check storage index (−1) | |
| | Set storage index = −2 |
| | Download file |
| | Check storage index (−2) |
| Since −1, set storage index = +1 | |
| | Since −2, set storage index = +2 |

Since the final number stored in the metadata is 2, there is an orphan file downloaded at storage index 1, with no record of it in the metadata. With multiple threads trying to download a file (as happens in a distribution server 504 in response to a SEARCH-REPLY) there is potential for having such orphan files.

The problem occurs because the two test-and-set operations—first from 0 to −1 and then from −1 to +1 are not atomic. Therefore, a mechanism is needed by which multiple threads can access data atomically when they need to. The sequence server 505 provides a way to achieve atomic access without using locks.

B. Sequence Server Operation

The basic idea is to have all threads access the storage indexes in storage system 414 through the sequence server 505. As mentioned above, sequence server 505 associates a random sequence number with each storage index. For example:

| BLOCK | STORAGE INDEX | SEQUENCE NO. |
|---|---|---|
| 0 | 1 | 87593576 |
| 1 | 2 | 28702345 |
| 2 | 3 | 65234658 |
| 3 | 1 | 93456640 |
| 4 | 2 | 24380976 |

When a thread does a "read with intention to modify" on the storage index, sequence server 505 increments the sequence number and returns the value of the index as well as the (incremented) sequence number. The thread can then modify the value and return the new value to sequence server 505 along with the sequence number. Sequence server 505 checks whether the sequence number matches the current sequence number for that storage index. If it does, it accepts the modified value. If not, it means either some other thread has read the value in between, or sequence server 505 just recovered from a crash and has generated new sequence numbers. In either case, sequence server 505 rejects the update and returns a failure. The thread must then handle the failure in some way depending on what operation it is trying to do. It can either do nothing, or it can sleep for a small, predetermined or random amount of time and then retry the read-modify-update.

Sequence server 505 stores the storage indexes in memory (e.g., random access memory) and a copy in a file on a local disk or in storage system 414. Any changes to the indexes are also updated in the file on a "write-through" basis. The sequence numbers are not stored in a file. In the event of a crash, the sequence server 505 is simply restarted, and it reads the storage indexes from the file and generates new sequence numbers.

When sequence server 505 is used for atomic updates to the storage-index metadata, the algorithm to download and save a block file becomes:

```
Read storage index "index" and sequence no. "Seq" for this block
from Sequence Server
if index is 0  { /* block not present */
    i = get_new_index()
    result = set index to –i at Sequence Server with Seq  /*
    negative means busy */
    if result is okay  { /* Seq matched up with the number at
    the Sequence Server and index is set */
        Download block file
        Read storage index "index" and "Seq" for this
        block from Sequence Server
        Set storage index to +i at Sequence Server with
        Seq
    }
    else {
        exit /* someone else is downloading this block */
    }
}
```

Now if two threads run the above algorithm for the same block file, the following sequence of events could occur:

| THREAD 1 | THREAD 2 |
|---|---|
| Read storage index=0 seq=100 | Read storage index=0 seq 101 |
| Generate new index, say 1 | Generate new index, say 2 |
| Set storage index = –1 result=bad | |
| exit | |
| | Set storage index = –2 result=good |
| | Read storage index=–2 seq=102 |
| | Download file |
| | Set storage index=+2 result=good |

C. Failover Design

There are failure modes to be addressed: failure of sequence server 505 and failure of a client (thread) that has set a negative number for a storage index (meaning the block is to be treated as busy). The failover for sequence server 505 is straightforward because there are no locks. The heartbeats of sequence server 505 are monitored using conventional techniques. If sequence server 505 dies (e.g., it's heartbeat disappears), it can simply be restarted. As it restarts, it will read-in the storage indexes from the file (if it exists) and generate a new set of (random) sequence numbers. If any client tries to update the storage index with an old sequence number, the operation will fail and the client will have to retry in the usual way.

If a client crashes after setting a negative number (indicating an incomplete operation) for a storage index, other clients must not wait forever for the storage index to change to zero or a positive number (indicating a completed operation). Sequence server 505 handles this situation as follows. Suppose Client A sets a storage index for a particular block file to –1 and then dies. If another client, say client B, reads the storage index and finds it to be –1, it continues with its normal course of action if it can (depending on what it is doing). For example, it could move on to download the next block file. If, however, Client B cannot proceed until this negative number changes, it sleeps for a time that is sufficient to indicate that Client A has died and then assumes that A has died. The course of action after that again depends on what Client B is trying to do. For example, if it is doing a sanity check to see if all blocks have been downloaded, it goes ahead and downloads the block.

V. Computing Environment

Figure 14:
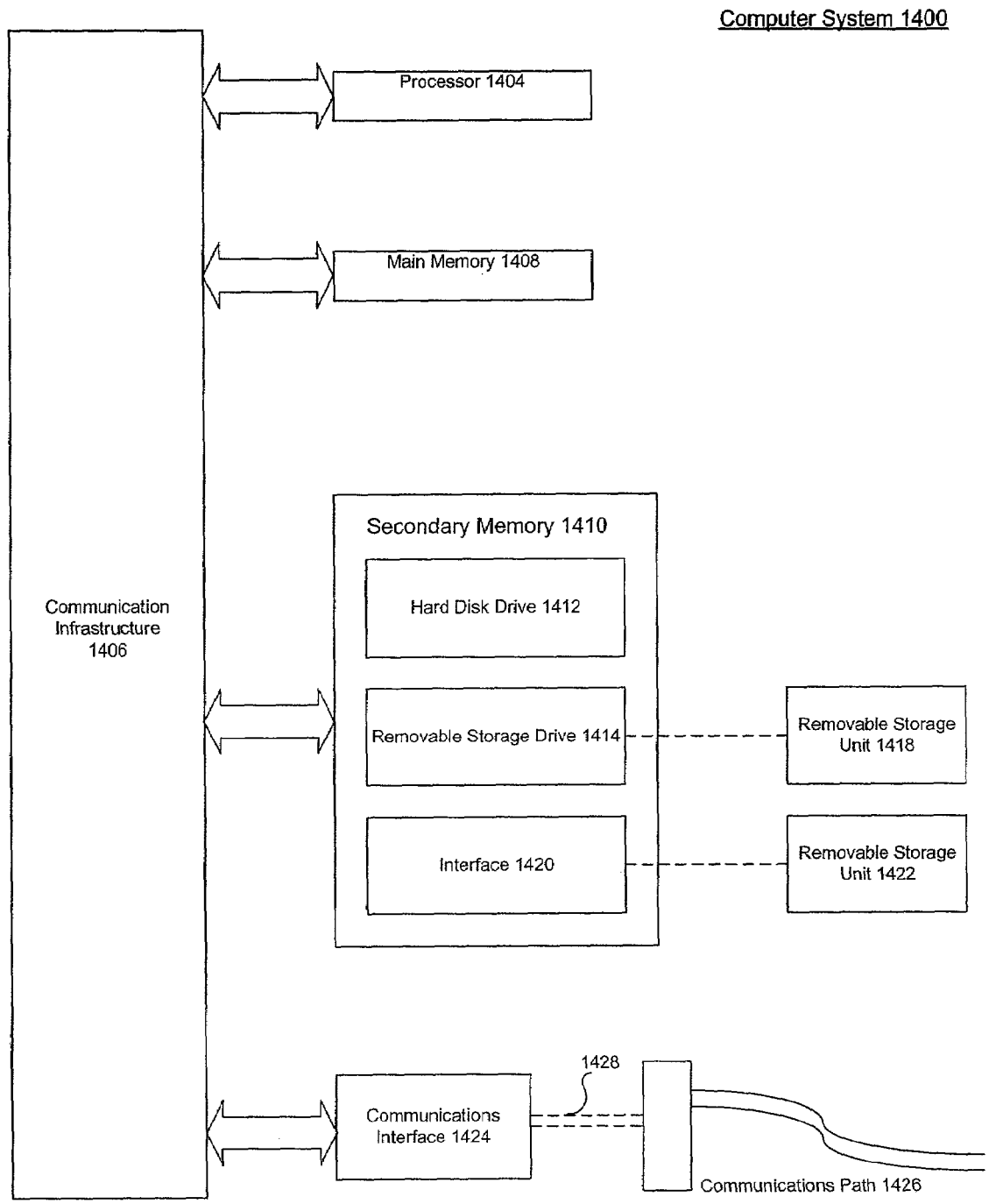
FIG. 14 is a block diagram of a computer system that provides a representative environment for implementation of the present invention.

The present invention may be implemented in software, hardware or a combination thereof and may be implemented using one or more computer systems or other processing systems. An example of a computer system that could be used to implement, for example, a content management server 110, a content provider client 106, a distribution station 114, a control unit 402, a distribution server 504, an application server 508, a sequence server 505 or any of the other computing platforms (also referred to herein as "machines" or "servers") is computer system 1400, shown in FIG. 14. The computer system 1400 includes one or more processors, such as processor 1404. The processor 1404 is connected to a communication infrastructure 1406 (e.g., a bus or network). Various embodiments can be described in terms of this exemplary computer system. However, after reading this description, it will become apparent to a person skilled in the relevant art how to implement the invention using other computer systems and/or computer architectures.

Computer system 1400 also includes a main memory 1408, preferably random access memory (RAM), and may also include a secondary memory 1410. The secondary memory 1410 may include, for example, a hard disk drive 1412 and/or a removable storage drive 1414, representing a floppy disk drive, a magnetic tape drive, an optical disk drive, etc. The removable storage drive 1414 reads from and/or writes to a removable storage unit 1418 in a well known manner. Removable storage unit 1418 represents a floppy disk, magnetic tape, optical disk, etc. As will be appreciated, the removable storage unit 1418 includes a computer usable storage medium having stored therein computer software and/or data.

Secondary memory 1410 can also include other similar means for allowing computer programs or input data to be loaded into computer system 1400. Such means may include, for example, a removable storage unit 1422 and an interface 1420. Examples of such may include a program cartridge and cartridge interface (such as that found in video game devices), a removable memory chip (such as an EPROM, or PROM) and associated socket, and other removable storage units 1422 and interfaces 1420 which allow software and data to be transferred from the removable storage unit 1422 to computer system 1400.

Computer system 1400 may also include a communications interface 1424. Communications interface 1424 allows software and data to be transferred between computer system 1400 and external devices. Examples of communications interface 1424 may include a modem, a network interface (such as an Ethernet card), a communications port, a PCMCIA slot and card, etc. Software and data transferred via communications interface 1424 are in the form of signals 1428 which may be electronic, electromagnetic, optical or other signals capable of being received by communications interface 1424. These signals 1428 are provided to communications interface 1424 via a communications path (i.e., channel) 1426. This channel 1426 carries signals 1428 into and out of computer system 1400, and may be implemented using wire or cable, fiber optics, a phone line, a cellular phone link, an RF link and other communications channels.

In an embodiment of the invention, signals 1428 can convey file content or various signals produced by processes running on computer system 1400 to fetch/send block files and manage assembly of a file payload.

In this document, the terms "computer program medium" and "computer usable medium" are used to generally refer to media such as removable storage drive 1414, a hard disk installed in hard disk drive 1412, and signals 1428. These computer program products are means for providing software to computer system 1400. The present invention includes such computer program products.

Computer programs (also called computer control logic) are stored in main memory 1408 and/or secondary memory 1410. Computer programs may also be received via communications interface 1424. Such computer programs, when executed, enable the computer system 1400 to perform the features of the present invention as discussed herein. In particular, the computer programs, when executed, enable the processor 1404 to perform the features of the present invention. Accordingly, such computer programs represent controllers of the computer system 1400.

VI. Conclusion

While various embodiments of the present invention have been described above, it should be understood that they have been presented by way of example, and not limitation. It will be apparent to persons skilled in the relevant art that various changes in detail can be made therein without departing from the spirit and scope of the invention. Thus, the present invention should not be limited by any of the above-described exemplary embodiments, but should be defined only in accordance with the following claims and their equivalents.

What is claimed is:

1. A method of assembling a file in response to a request from a user sent to a first node in a network having a plurality of connected nodes, comprising:
   determining, based on the request, which content components are necessary to assemble the file;
   if all content components are not present at the first node, sending a search request to determine which other nodes have content components;
   receiving, from said other nodes, replies to said search request, each reply from a responding node indicating which content components are available from said responding node;
   determining a desired set of at least one node from which to download the content components;
   downloading the content components from the desired set, wherein the downloading further includes
      creating, at said first node, a process representing a request for a content component from at least one node having the content component,
      creating, at said first node, a plurality of processes, each process representing a request for a content component from one of said plurality of nodes,
      associating a flag with each content component to be downloaded, said flag indicating whether an associated content component has already been downloaded, had not been downloaded or is currently being downloaded,
      associating a unique sequence number with each flag,
      in response to one of said plurality of processes reading said flag to determine whether said associated content component has already been downloaded, incrementing said sequence number and passing said incremented sequence number to said reading process,
      in response to a request by said reading process to modify said flag to indicate that said associated content component is currently being downloaded, comparing said incremented sequence number passed to said reading process to said incremented sequence number associated with said flag,
      if said incremented sequence number passed to said reading process matches said incremented sequence number associated with said flag, accepting said modification to said flag, and
      if said incremented sequence number passed to said reading process does not match said incremented sequence number associated with said flag, rejecting said modification to said flag, wherein race conditions are avoided when more than one process attempts to download the same content component; and
   assembling the file from the downloaded content components.

2. The method of claim 1, wherein said content components are block files and wherein said first determining comprises: determining a number of necessary block files based at least in part on metadata associated with the file.

3. The method of claim 1, wherein said sending further comprises: referring to a set of attributes and a set of rolled up attributes for identification of each of the plurality of nodes.

4. The method of claim 1, wherein the nodes are organized in a virtual tree and said sending comprises: sending a notification to neighboring nodes in the virtual tree to determine the existence of the content components, wherein the notification includes distribution criteria of at least one of the content components.

5. The method of claim 4, wherein said sending further comprises: propagating the search request to at least one node in the network that satisfies the distribution criteria.

6. The method of claim 4, wherein said sending further comprises: forwarding, by each neighboring node in receipt of the search request, the notification to next nodes that are in a neighbor relationship with each neighboring node excluding the neighboring nodes from which the search request was received.

7. The method of claim 1, wherein said receiving comprises: receiving, from said other nodes, replies to said search request, each reply from a responding node indicating which content components are available from said responding node and performance characteristics of said responding node.

8. The method of claim 1, wherein said downloading comprises: downloading a first portion of the content components from a first responding node in parallel with downloading a second portion of the content components from a second responding node.

9. The method of claim 1, wherein said second determining comprises: determining a desired set of at least one node from which to download the content components, wherein said at least one node is selected based at least in part on proximity to the first node.

10. A computer program product comprising a computer usable medium having computer readable program code means embodied in said medium for causing an application program to execute on a computer to assemble a file in response to a request from a user sent to a first node in a network having a plurality of connected nodes, said computer readable program code means comprising:

first computer readable program code means for causing the computer to determine, based on the request, which content components are necessary to assemble the file;

second computer readable program code means for causing the computer, if all content components are not present at the first node, to send a search request to determine which other nodes have content components;

third computer readable program code means for causing the computer to receive, from said other nodes, replies to said search request, each reply from a responding node indicating which content components are available from said responding node;

fourth computer readable program code means for causing the computer to determine a desired set of at least one node from which to download the content components;

fifth computer readable program code means for causing the computer to download the content components from the desired set, wherein the fifth computer readable program code means includes means for creating, at said first node, a plurality of processes, each process representing a request for a content component from one of said plurality of nodes, means for associating a flag with each content component to be downloaded, said flag indicating whether an associated content component has already been downloaded, had not been downloaded or is currently being downloaded, means for associating a unique sequence number with each flag, means for incrementing said sequence number and passing said incremented sequence number to said reading process in response to one of said plurality of processes reading said flag to determine whether said associated content component has already been downloaded, means for comparing, in response to a request by said reading process to modify said flag to indicate that said associated content component is currently being downloaded, said incremented sequence number passed to said reading process to said incremented sequence number associated with said flag, means for accepting said modification to said flag if said incremented sequence number passed to said reading process matches said incremented sequence number associated with said flag, and means for rejecting said modification to said flag if said incremented sequence number passed to said reading process does not match said incremented sequence number associated with said flag, wherein race conditions are avoided when more than one process attempts to download the same content component; and sixth computer readable program code means for causing the computer to assemble the file from the downloaded content components.

11. The computer program product of claim 10, wherein said content components are block files and wherein said first computer readable program code means comprises: means for determining a number of necessary block files based at least in part on metadata associated with the file.

12. The computer program product of claim 10, wherein the nodes are organized in a virtual tree and wherein said second computer readable program code means comprises: means for sending a notification to neighboring nodes in the virtual tree to determine the existence of the content components, wherein the notification includes distribution criteria of at least one of the content components.

13. The computer program product of claim 10, wherein said third computer readable program code means comprises: means for receiving, from said other nodes, replies to said search request, each reply from a responding node indicating which content components are available from said responding node and performance characteristics of said responding node.

14. The computer program product of claim 10, wherein said fifth computer readable program code means comprises: means for downloading a first portion of the content components from a first responding node in parallel with downloading a second portion of the content components from a second responding node.

15. The computer program product of claim 10, wherein said fourth computer readable program code means comprises: means for determining a desired set of at least one node from which to download the content components, wherein said at least one node is selected based at least in part on proximity to the first node.

16. A computer-based system for assembling a file in response to a request from a user sent to a first node in a network having a plurality of connected nodes, said system comprising:

means for determining, based on the request, which content components are necessary to assemble the file;

means for sending a search request, if all content components are not present at the first node, to determine which other nodes have content components;

means for receiving, from said other nodes, replies to said search request, each reply from a responding node indicating which content components are available from said responding node;

means for determining a desired set of at least one node from which to download the content components;

means for downloading the content components from the desired set, wherein the means for downloading includes means for creating, at said first node, a plurality of processes, each process representing a request for a content component from one of said plurality of nodes;

means for associating a flag with each content component to be downloaded, said flag indicating whether an associated content component has already been downloaded, had not been downloaded or is currently being downloaded, means for associating a unique sequence number with each flag, means for incrementing said sequence number and passing said incremented sequence number to said reading process in response to one of said plurality of processes reading said flag to determine whether said associated content component has already been downloaded, means for comparing, in response to a request by said reading process to modify said flag to indicate that said associated content component is currently being downloaded, said incremented sequence number passed to said reading process to said incremented sequence number associated with said flag means for accepting said modification to said flag if said incremented sequence number passed to said reading process matches said incremented sequence number associated with said flag, and means for rejecting said modification to said flag if said incremented sequence number passed to said reading process does not match said incremented sequence number associated with said flag, wherein race conditions are avoided when more than one process attempts to download the same content component; and means for assembling the file from the downloaded content components.

17. The computer-based system of claim 16, wherein said content components are block files and wherein said first determining means comprises: means for determining a number of necessary block files based at least in part on metadata associated with the file.

18. The computer-based system of claim 16, wherein the nodes are organized in a virtual tree and wherein said sending means comprises: means for sending a notification to neighboring nodes in the virtual tree to determine the existence of the content components, wherein the notification includes distribution criteria of at least one of the content components.

19. The computer-based system of claim 16, wherein said receiving means comprises: means for receiving, from said other nodes, replies to said search request, each reply from a responding node indicating which content components are available from said responding node and performance characteristics of said responding node.

20. The computer-based system of claim 16, wherein said downloading means comprises: means for downloading a first portion of the content components from a first responding node in parallel with downloading a second portion of the content components from a second responding node.

21. The computer-based system of claim 16, wherein said second determining means comprises: means for determining a desired set of at least one node from which to download the content components, wherein said at least one node is selected based at least in part on proximity to the first node.

* * * * *